(12) United States Patent
Sieber et al.

(10) Patent No.: US 10,215,152 B2
(45) Date of Patent: Feb. 26, 2019

(54) SYSTEM, METHOD AND APPARATUS FOR PRESSURIZING A FLUID TO POWER A LOAD

(71) Applicant: AOE Accumulated Ocean Energy Inc., Sooke (CA)

(72) Inventors: Joseph Sieber, Qualicum Beach (CA); Jimmie Allen Matei, Sooke (CA)

(73) Assignee: AOE ACCUMULATED OCEAN ENERGY INC., Sooke, British Columbia (CA)

( * ) Notice: Subject to any disclaimer, the term of this patent is extended or adjusted under 35 U.S.C. 154(b) by 483 days.

(21) Appl. No.: 14/437,041

(22) PCT Filed: Dec. 4, 2013

(86) PCT No.: PCT/CA2013/050932
§ 371 (c)(1),
(2) Date: Apr. 20, 2015

(87) PCT Pub. No.: WO2014/085928
PCT Pub. Date: Jun. 12, 2014

(65) Prior Publication Data
US 2015/0275849 A1  Oct. 1, 2015

Related U.S. Application Data

(60) Provisional application No. 61/888,651, filed on Oct. 9, 2013, provisional application No. 61/733,434, filed on Dec. 5, 2012.

(51) Int. Cl.
*F03B 13/24* (2006.01)
*F03B 13/18* (2006.01)
*F03B 13/14* (2006.01)

(52) U.S. Cl.
CPC .............. *F03B 13/24* (2013.01); *F03B 13/14* (2013.01); *F03B 13/1875* (2013.01);
(Continued)

(58) Field of Classification Search
CPC .......... F03B 13/14; F03B 13/18; F03B 13/24; F04B 9/133
See application file for complete search history.

(56) References Cited

U.S. PATENT DOCUMENTS 4,047,894 A * 9/1977 Kuhl ...................... B01D 53/18
261/101
5,085,343 A * 2/1992 Scarr ...................... B64G 1/402
220/4.14
(Continued)

FOREIGN PATENT DOCUMENTS

GB    2331126 A    5/1999
GB    2466480 A    6/2010
(Continued)

*Primary Examiner* — F. Daniel Lopez
*Assistant Examiner* — Matthew Wiblin
(74) *Attorney, Agent, or Firm* — Davis & Bujold PLLC; Michael J. Bujold

(57) ABSTRACT

The present invention relates to a way of pressurizing a fluid to power a load, by initially pressurizing the fluid in a series of stages to yield a low-pressure fluid and further pressurizing the low-pressure fluid concurrently in parallel stages to yield a high-pressure fluid for supply to the load.

9 Claims, 28 Drawing Sheets

(52) U.S. Cl.
CPC ....... *F05B 2240/40* (2013.01); *F05B 2260/42* (2013.01); *Y02E 10/38* (2013.01)

(56) References Cited

U.S. PATENT DOCUMENTS

| | | | | |
|---|---|---|---|---|
| 5,179,837 | A | * | 1/1993 | Sieber ................... F03B 13/148 417/331 |
| 5,394,695 | A | | 3/1995 | Sieber |
| 7,093,337 | B1 | * | 8/2006 | Taylor ................... B64G 1/402 220/4.14 |
| 7,517,199 | B2 | * | 4/2009 | Reed ................... F04B 43/0736 417/395 |
| 7,690,900 | B2 | | 4/2010 | Sieber |
| 7,877,994 | B2 | | 2/2011 | Bull et al. |
| 8,186,972 | B1 | * | 5/2012 | Glauber ................. F04B 9/133 417/254 |
| 8,807,963 | B1 | * | 8/2014 | Pandit ................... F03B 13/187 290/53 |
| 2009/0284014 | A1 | * | 11/2009 | Sieber ................... F03B 13/187 290/53 |
| 2010/0170658 | A1 | | 7/2010 | Seefeldt et al. |
| 2010/0212872 | A1 | * | 8/2010 | Carlson ................ B01F 5/0617 165/109.1 |
| 2011/0236224 | A1 | * | 9/2011 | Glauber ................. F04B 9/133 417/46 |
| 2012/0038174 | A1 | | 2/2012 | Bryant et al. |
| 2012/0060777 | A1 | * | 3/2012 | Tikkanen ................ F01P 7/044 123/41.11 |

FOREIGN PATENT DOCUMENTS

| | | | |
|---|---|---|---|
| GR | 1005790 B2 * | 1/2008 | ............. F04B 13/24 |
| JP | H01167468 A | 7/1989 | |

\* cited by examiner

Prior Art

Prior Art

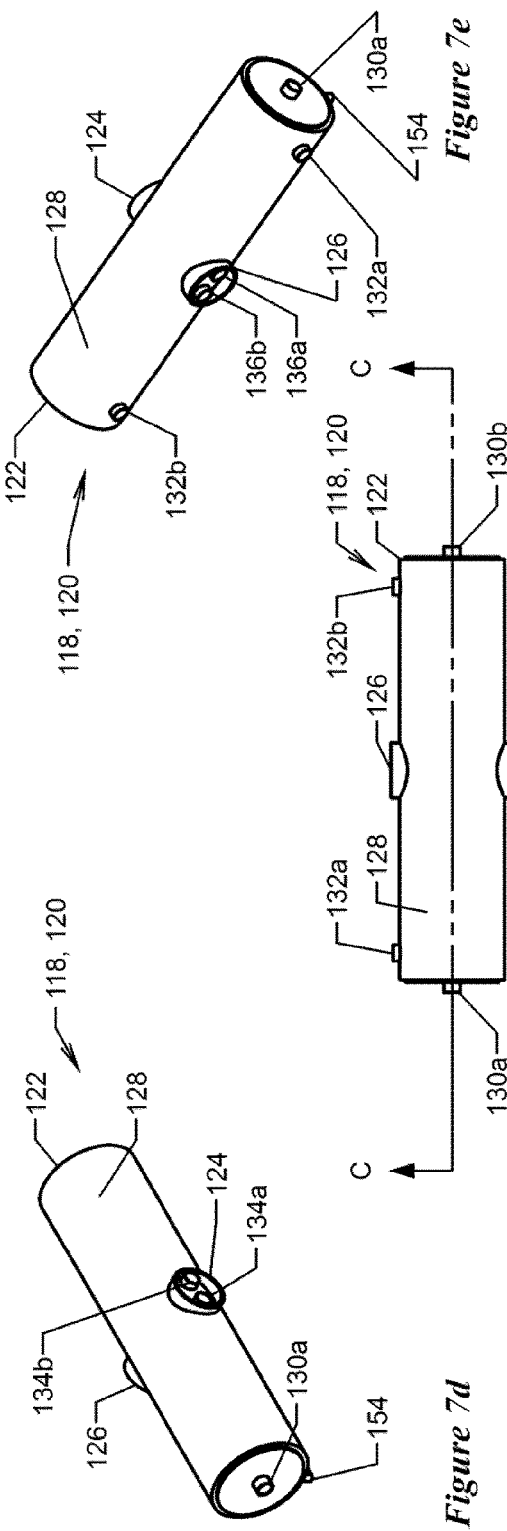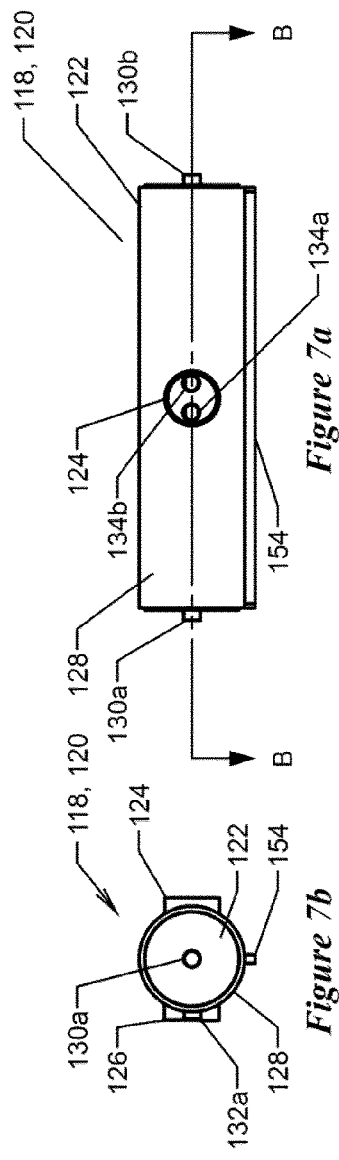

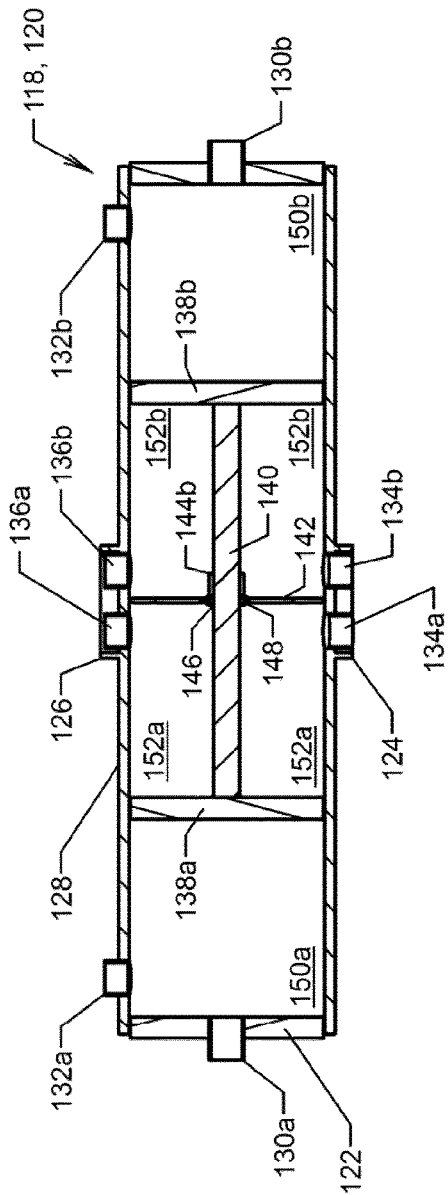
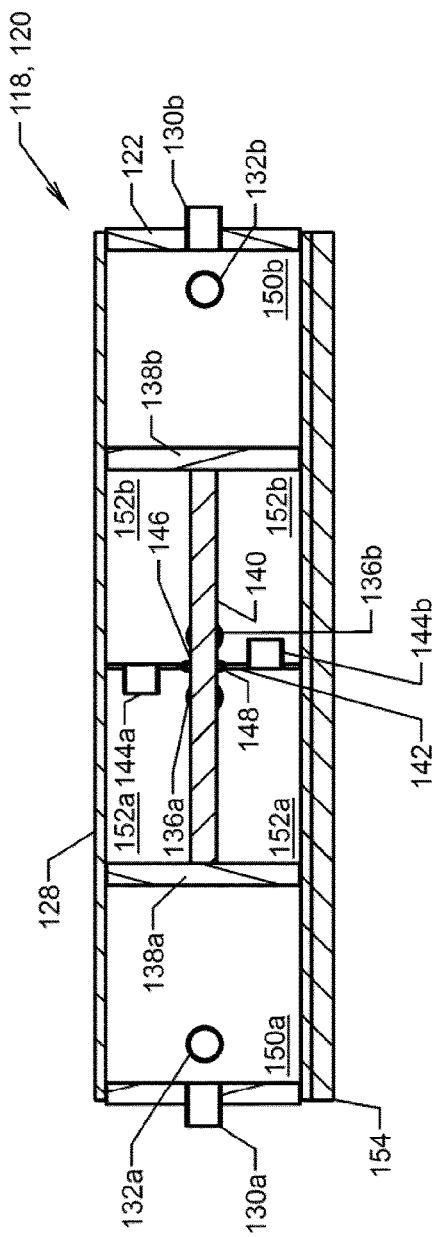
Figure 7f
Figure 7g

| Stage | P1 psia | P2 psia | P1/P2 | Compression Mode for Air (C) | | Transfer Mode for Air (T) | | (C) + (T) Cumulative Total Charging + Transfer KW (C+T) |
|---|---|---|---|---|---|---|---|---|
| | | | | Total Charging KW (C) | Cumulative Total Charging KW (C) | Total Transfer KW (T) | Cumulative Total Transfer KW (T) | |
| 1 | 14.70 | 22.05 | 0.67 | 19.25 | 19.25 | 76.99 | 76.99 | 96.23 |
| 2 | 22.05 | 33.08 | 0.67 | 19.25 | 38.49 | 76.99 | 153.97 | 192.47 |
| 3 | 33.08 | 49.61 | 0.67 | 19.25 | 57.74 | 76.99 | 230.96 | 288.70 |
| 4 | 49.61 | 74.42 | 0.67 | 19.25 | 76.99 | 76.99 | 307.95 | 384.94 |
| 5 | 74.42 | 111.63 | 0.67 | 19.25 | 96.23 | 76.99 | 384.94 | 481.17 |
| 6 | 111.63 | 167.44 | 0.67 | 19.25 | 115.48 | 76.99 | 461.92 | 577.40 |
| 7 | 167.44 | 251.16 | 0.67 | 19.25 | 134.73 | 76.99 | 538.91 | 673.64 |
| 8 | 251.16 | 376.74 | 0.67 | 19.25 | 153.97 | 76.99 | 615.90 | 769.87 |
| 9 | 376.74 | 565.12 | 0.67 | 19.25 | 173.22 | 76.99 | 692.88 | 866.11 |
| 10 | 565.12 | 847.68 | 0.67 | 19.25 | 192.47 | 76.99 | 769.87 | 962.34 |
| 11 | 847.68 | 1200.00 | 0.71 | 16.95 | 209.42 | 81.58 | 851.45 | 1060.87 |
| 12 | 1200.00 | 1800.00 | 0.67 | 19.25 | 228.67 | 76.99 | 928.43 | 1157.10 |
| 13 | 1800.00 | 2700.00 | 0.67 | 19.25 | 247.91 | 76.99 | 1005.42 | 1253.34 |
| 14 | 2700.00 | 4050.00 | 0.67 | 19.25 | 267.16 | 76.99 | 1082.41 | 1349.57 |

| Direct 1 to 14 | 14.70 | 4050.00 | 3.63E-03 | 57.53 | 57.53 | 0.42 | 0.42 | Total KW 57.95 |
|---|---|---|---|---|---|---|---|---|

Figure 9

| Compression Ratio & Buoyant Force Relationship ||||| 
|---|---|---|---|---|
| Variable | Property | Value | Unit | Comments |
| H | Nominal Wave Height | 8 | ft | Environmental characteristic |
| A | Piston Area | 314.159 | in^2 | Nominal 20" diameter cylinder |
| P1 | Input Pressure |  | lb/in^2 | psia |
| C | Compression Ratio | 1.5 |  | Selected per Specification |
|  |  | 2 |  |  |
| P2 | Output Pressure |  | lb/in^2 | P2 = P1 * C |
| F | Buoyant Force Applied |  | lb | F = (P2-P1) * A |
| S | Submersion of Float | 1.50 | ft | Deeper submergence enables use of smaller diameter float to produce same buoyant force |
|  |  | 1.75 |  |  |
|  |  | 2.25 |  |  |
|  |  | 2.75 |  |  |
| U | Unit Force Applied |  | lb/ft | U=F/S |
| ρ | Buoyant Fluid Density | 64.5 | lb/ft^3 | sea water |
| D | Float Diameter |  | ft | (U/ρ*4/pi)^-1 |

| Stage | P1 | P2 | Buoyant Force | Unit Force Applied | Float Diameter | Subm. Selected | Comp Ratio Selected |
|---|---|---|---|---|---|---|---|
|  | psia | psia | lb | lb/ft | ft | ft |  |
| 1 | 14.7 | 29.4 | 4618.137 | 3078.7582 | 7.796 | 1.5 | 2 |
| 2 | 29.4 | 58.8 | 9236.275 | 5277.8712 | 10.207 | 1.75 | 2 |
| 3 | 58.8 | 117.6 | 18472.55 | 8210.02187 | 12.731 | 2.25 | 2 |
| 4 | 117.6 | 235.2 | 36945.1 | 13434.5812 | 16.285 | 2.75 | 2 |
| 5 | 235.2 | 352.8 | 36945.1 | 13434.5812 | 16.285 | 2.75 | 1.5 |
|  | 235.2 | 352.8 | 36945.1 | 13434.5812 | 16.285 | 2.75 | 1.5 |
|  | 235.2 | 352.8 | 36945.1 | 13434.5812 | 16.285 | 2.75 | 1.5 |
|  | 235.2 | 352.8 | 36945.1 | 13434.5812 | 16.285 | 2.75 | 1.5 |
|  | 235.2 | 352.8 | 36945.1 | 13434.5812 | 16.285 | 2.75 | 1.5 |
|  | 235.2 | 352.8 | 36945.1 | 13434.5812 | 16.285 | 2.75 | 1.5 |

SYSTEM, METHOD AND APPARATUS FOR PRESSURIZING A FLUID TO POWER A LOAD

CROSS-REFERENCE

This application claims priority from U.S. provisional patent application 61/733,434 for a SINGLE-STAGE PISTON GENERATOR filed Dec. 5, 2012 and U.S. provisional patent application 61/888,651 for a SYSTEM AND METHOD FOR PRESSURIZING A FLUID TO POWER A LOAD filed Oct. 9, 2013, the entire contents of both of which are expressly incorporated by reference herein, to the fullest extent permitted by law.

BACKGROUND

1. Field

The present invention relates to a system, method and apparatus for pressurizing fluid to power a load. More particularly, the invention relates to series-parallel arrangements of pressurization units, including multi-stage pressurization units, connected to power loads such as reservoirs, generators, extractors (such as desalinators and carbon dioxide sequestrators), and injectors (such as hypoxia-reducing air injectors) for example, either directly or via a manifold to power more than one load. More particularly, the invention relates to aquatic deployment of pressurization units, wherein each pressurization unit includes a submersible standardized cylinder and a tailored float selected for efficient operation with reference to the characteristics of the standardized cylinder, the wave characteristics of the aquatic environment, and the desired fluid pressure operating range of the pressurization unit.

2. Description of Related Art

A great variety of approaches have been proposed to generate energy from waves. One common approach is to deploy a float that rides up and down with wave motion relative to a fixed or anchored member that remains relatively stationary. An air compression cylinder is introduced between the float and the stationary member, which in cooperation with intake and output conduits and associated check valves receives, compresses and supplies air that is accumulated as the float rises and falls with the wave motion and urges the cylinder to extend and retract. Variations to such pressurization units have been made to pressurize liquids or to pump water to fill an elevated water reservoir on shore. The potential energy stored in the pressurized fluid, e.g. air or water, is then used to drive a conventional machine such as a turbine/generator set to supply electrical energy.

Conventional single unit devices and multiple arrays of units conventionally connected in parallel suffer from the disadvantage that a relatively high minimum amplitude of wave must be encountered before the pressure in the cylinder reaches a level at which useable pressurized fluid is generated. As a result, waves having an amplitude below such a minimum threshold do not generate any energy. The minimum amplitude is determined by the design of the pressurizing cylinder, and this disadvantage is present in both single unit devices and multiple unit arrays of the conventional methods and devices.

The applicant's U.S. Pat. No. 5,179,837, U.S. Pat. No. 5,394,695 and U.S. Pat. No. 7,690,900 disclose methods and systems for generating energy from the motion of waves by a plurality of series-connected floating pressurization units, wherein each unit incrementally increases the pressure in a compression fluid flowing therethrough using energy in water waves. The system provides for a new ambient pressure starting point at each stage in the series, such that each successive downstream stage has a higher initial pressure than the previous stage(s). Energy is transferred from the waves to the fluid by relative movement between a first floating portion and second submerged portion of the unit. The second portion has a piston that extends upwardly into a compression chamber of the second portion. Vertical oscillation of the first portion as it reacts to the wave causes the piston and chamber to vertically move relative to each other, thereby pressurizing the fluid in the chamber and driving the fluid through an outlet valve to an intermediate reservoir and then to the next adjacent pressurization unit. When the cylinder bottom stops moving away from the piston, fluid pressurization stops and new fluid flows into the cylinder. The outlet valve is biased to open at a selected outlet pressure; when the pressure in the chamber decreases below the outlet pressure, fluid transmission from the chamber stops, but transmission from the intermediate reservoir to the next pressurization unit continues. Therefore, fluid tends to be conveyed through the device in pressurized pulses, wherein the oscillation of the pulses depends on the oscillation of the waves.

Although extremely useful, a series system still presents certain challenges for some applications. For example, the pressurized fluid that expands to power a load, whether exhausted or recycled back to the first pressurizing unit in the series, depressurizes to a low pressure, for example atmospheric pressure. Continued operation requires fully pressurizing fluid from atmospheric pressure, always starting from the first pressurization unit at the beginning of the series.

Furthermore, that full expansion is a thermal sink that, if large enough, can freeze proximate equipment. It would be desirable to be able to harness an expansion of a high pressure range of an $n^{th}$ stage in a closed loop system, since high pressure operation can permit lower fluid volumes and hence smaller system components.

It would also be desirable to build such a system with a network of standardized pressurization units (and where possible, through topology or otherwise, using at least some identical pressurization units) to take advantage of manufacturing and maintenance efficiencies from economies of scale. It would also be desirable to build such a system so as to simplify deployment, for example by deploying fewer pressurization units and deploying fewer conduits between them. It would also be desirable to configure the pressurization units and the conduits to better resist exterior and interior pressures.

Finally, it would be desirable to configure such a system to provide multiple functions simultaneously or otherwise, for example a combination of generating power, desalinating sea water, sequestering carbon dioxide and counteracting hypoxia.

SUMMARY

The present invention is directed to these and other needs.

According to one aspect of the present invention, there is provided a method of pressurizing a fluid to power a load, which involves initially pressurizing the fluid in a series of stages to yield a low pressure fluid, and further pressurizing the low pressure fluid concurrently in parallel stages to yield a high pressure fluid for supply to the load.

The method might include supplying the high pressure fluid to the load.

The method might include accumulating the high pressure fluid as an accumulated high pressure fluid and supplying the accumulated high pressure fluid to the load.

The method might include accumulating the low pressure fluid as an accumulated low pressure fluid and perhaps receiving fluid from the load at the low pressure and combining it with the accumulated low pressure fluid, and perhaps repressurizing the combined accumulated low pressure fluid concurrently in parallel stages to yield the high pressure fluid.

Initially pressurizing the fluid might include initially pressurizing the fluid only when the combined accumulated low pressure fluid is less than a predetermined threshold or might include distributing surplus low pressure fluid when the combined accumulated low pressure fluid is greater than a predetermined threshold.

Supplying the high pressure fluid to the load might include supplying the high pressure fluid to a pump.

The number of series stages might equal the number of parallel stages.

Initially pressurizing and further pressurizing might include pressurizing at a nominal ratio of 1.5:1 per stage. Initially pressurizing might include pressurizing from atmospheric pressure.

According to another aspect of the present invention, there is provided a system for pressurizing a fluid to power a load, which includes: a charging subsystem having a plurality of series-connected pressurizing units operable to initially pressurize the fluid to a low pressure, thereby yielding a low pressure fluid, and an operating subsystem having a plurality of parallel-connected pressurizing units operable to further pressurize to a high pressure fluid received from the charging subsystem at low pressure, thereby yielding a high pressure fluid.

The operating subsystem might further include a low pressure reservoir configured to accumulate the low pressure fluid received from the charging subsystem and a high pressure reservoir configured to accumulate the high pressure fluid, such that the high pressure reservoir is connectable to supply the load with high pressure fluid and the low pressure reservoir is connectable to receive fluid from the load for combination with the low pressure fluid.

The charging subsystem might initially pressurize the fluid to a low pressure from atmospheric pressure and be configured to deactivate when the low pressure reservoir is within a predetermined threshold of its capacity for storing the low pressure fluid or the charging subsystem might be configured to distribute surplus low pressure fluid when the low pressure reservoir is within a predetermined threshold of its capacity for storing the low pressure fluid. In the latter regard, the system may further include a manifold connected to the charging system to distribute the surplus low pressure fluid. Thus, for example, the latter system may include a second operating subsystem connected to the manifold to receive surplus low pressure fluid or at least one of a high-capacity reservoir and a machine connected to the manifold to receive surplus low pressure fluid.

The system might further include the load, for example a pump, which might include: a tank, opposing first and second piston heads slidably housed within the tank, and a bulkhead transversely bisecting the tank between the first and second piston heads, wherein the first piston head sealingly divides the tank into a first air compartment and a water compartment, wherein the second piston head sealingly divides the tank into a second air compartment and the water compartment, and wherein the bulkhead sealingly divides the water compartment into a first water compartment and a second water compartment.

In such a system, the number of series-connected pressurizing units in the charging subsystem may be equal to the number parallel-connected pressurizing units in the operating subsystem. The respective pressurizing units may have a nominal pressurizing ratio of 1.5:1

Each pressurizing unit might include a cylinder with a piston rod slidably extending there from, and a float attached to the piston rod. All pressurizing units might have identical cylinders.

For any two pressurizing units pressurizing fluid in two different pressure ranges, the float of the one pressurizing unit pressurizing fluid in the higher pressure range might exert a buoyant force at least as large as does the float of the other pressurizing unit. In this regard, the float of the one pressurizing unit pressurizing fluid in the higher pressure range might have a diameter at least as large as does the float of the other pressurizing unit or might be submerged at least as deep as is the float of the other pressurizing unit.

At least one pressurization unit might have a cylinder with more than one pressurization stage, for example three series-connected pressurization stages.

At least one pressurization unit might have a cylinder with a piston chamber nested within at least one sealed chamber, for example three sealed chambers.

According to yet another aspect of the present invention, there is provided a system for pressurizing a fluid to power a load, which system includes: a charging subsystem to initially pressurize the fluid to a low pressure, a low pressure reservoir connected to receive low pressure fluid from the charging subsystem, an operating subsystem connected to receive low pressure fluid from the low pressure reservoir and to further pressurize the low pressure fluid to a high pressure, a high pressure reservoir connected to receive the high pressure fluid from the operating subsystem, and a load connected to receive high pressure fluid from the high pressure reservoir for expansion at the load, and connected to the low pressure reservoir to supply the expanded high pressure fluid back to the low pressure reservoir.

The charging subsystem may be configured to deactivate when the low pressure reservoir is within a predetermined threshold of its capacity for storing the low pressure fluid. Alternatively, the charging subsystem may be configured to distribute surplus low pressure fluid when the low pressure reservoir is within a predetermined threshold of its capacity for storing the low pressure fluid. In this regard, the system may further include a manifold connected to the charging system to distribute the surplus low pressure fluid, and, connected to the manifold to receive surplus low pressure fluid, for example, a second operating subsystem, a high-capacity reservoir or a machine.

The charging subsystem may be operable to initially pressurize the fluid to a low pressure from atmospheric pressure and may have a plurality of series-connected pressurizing units.

The operating subsystem may have a plurality of parallel-connected pressurizing units, perhaps equal to the number series-connected pressurizing units in the charging subsystem.

The high pressure reservoir might be nested within the low pressure reservoir.

The system might further include a sequestration module, wherein the low pressure reservoir is connected to receive low pressure fluid from the charging subsystem via the sequestration module.

According to another aspect of the invention, there is provided an apparatus for pressurizing fluid, including a cylinder with three series-connected stages, each of the stages having a piston tube and a piston head. The cylinder may further include a common piston rod connected to the respective piston head of each of the stages.

According to still another aspect of the invention, there is provided an apparatus for pressurizing fluid, including a cylinder having a piston chamber nested within at least one sealed chamber, for example nested within three sealed chambers.

According to yet another aspect of the invention, there is provided an apparatus for storing and conveying pressurized fluid, including a low pressure reservoir for storing low pressure fluid, and a high pressure reservoir for storing high pressure fluid, wherein the high pressure reservoir is nested within the low pressure reservoir.

According to another aspect of the invention, there is provided a system for pressurizing a fluid to power a load, having a pressurizing unit configured to receive and pressurize the fluid and to supply the pressurized fluid, and a sequestration module configured to receive the pressurized fluid, sequester a component of the pressurized fluid, and supply the pressurized fluid without the sequestered component. The pressurizing unit may be configured to supply power to the sequestration module. The fluid might be air and the component might be carbon dioxide, for example.

Further aspects and advantages of the present invention will become apparent upon considering the following drawings, description, and claims.

DESCRIPTION

The invention will be more fully illustrated by the following detailed description of non-limiting specific embodiments in conjunction with the accompanying drawing figures. In the figures, similar elements and/or features may have the same reference label. Further, various elements of the same type may be distinguished by following the reference label with additional labels that distinguish among the similar elements. If only the first reference label is identified in a particular passage of the detailed description, then that passage describes any one of the similar elements having the same first reference label irrespective of the additional reference labels.

BRIEF DESCRIPTION OF THE DRAWINGS

FIG. 1a is a front elevation view of a pressurization unit embodying aspects of the present invention, the unit having a pressurizing cylinder with an input and an output, the cylinder being suspended from a float.

FIG. 1b is a top-front-left isometric view of the pressurization unit of FIG. 1a.

FIG. 1c is a top-front-right isometric view of the pressurization unit of FIG. 1a.

FIG. 1d is a front elevation sectional view detailing the input and the output of the pressurizing cylinder of the pressurization unit of FIG. 1a, viewed at the cutting plane A-A in FIG. 1b.

FIG. 4b is a front elevation view of the system of FIG. 4a.

FIG. 5b is a front elevation view of the system of FIG. 5a.

FIG. 6b is a top-front-right isometric view of the system of FIG. 6a.

FIG. 6c is a bottom-front-left isometric view of the system of FIG. 6a.

FIG. 6d is a bottom-front-right isometric view of the system of FIG. 6a.

FIG. 6e is a front elevation view of the system of FIG. 6a.

FIG. 6f is a top plan view of the system of FIG. 6a.

FIG. 6g is a bottom plan view of the system of FIG. 6a.

FIG. 6h is a left side elevation view of the system of FIG. 6a.

FIG. 6i is a right side elevation view of the system of FIG. 6a.

FIG. 7a is a front elevation view of a load that is suitable to be powered by the system of FIG. 6a, a high pressure water pump.

FIG. 7b is a left side elevation view of the load of FIG. 7a.

FIG. 7c is a top plan view of the load of FIG. 7a.

FIG. 7d is a top-front-left isometric view of the load of FIG. 7a.

FIG. 7e is a top-back-left isometric view of the load of FIG. 7a.

FIG. 7f is top plan sectional view of the load of FIG. 7a, as viewed at the cutting plane B-B in FIG. 7a.

FIG. 7g is a front elevation sectional view of the load of FIG. 7a, viewed at the cutting plane C-C in FIG. 7c.

FIG. 9 is a tabulation of exemplary operating values for fourteen stages of the pressurization units of FIG. 1a.

FIG. 11 is a tabulation of exemplary parameters for the standard cylinders and tailored floats of FIG. 10.

Figure 1:
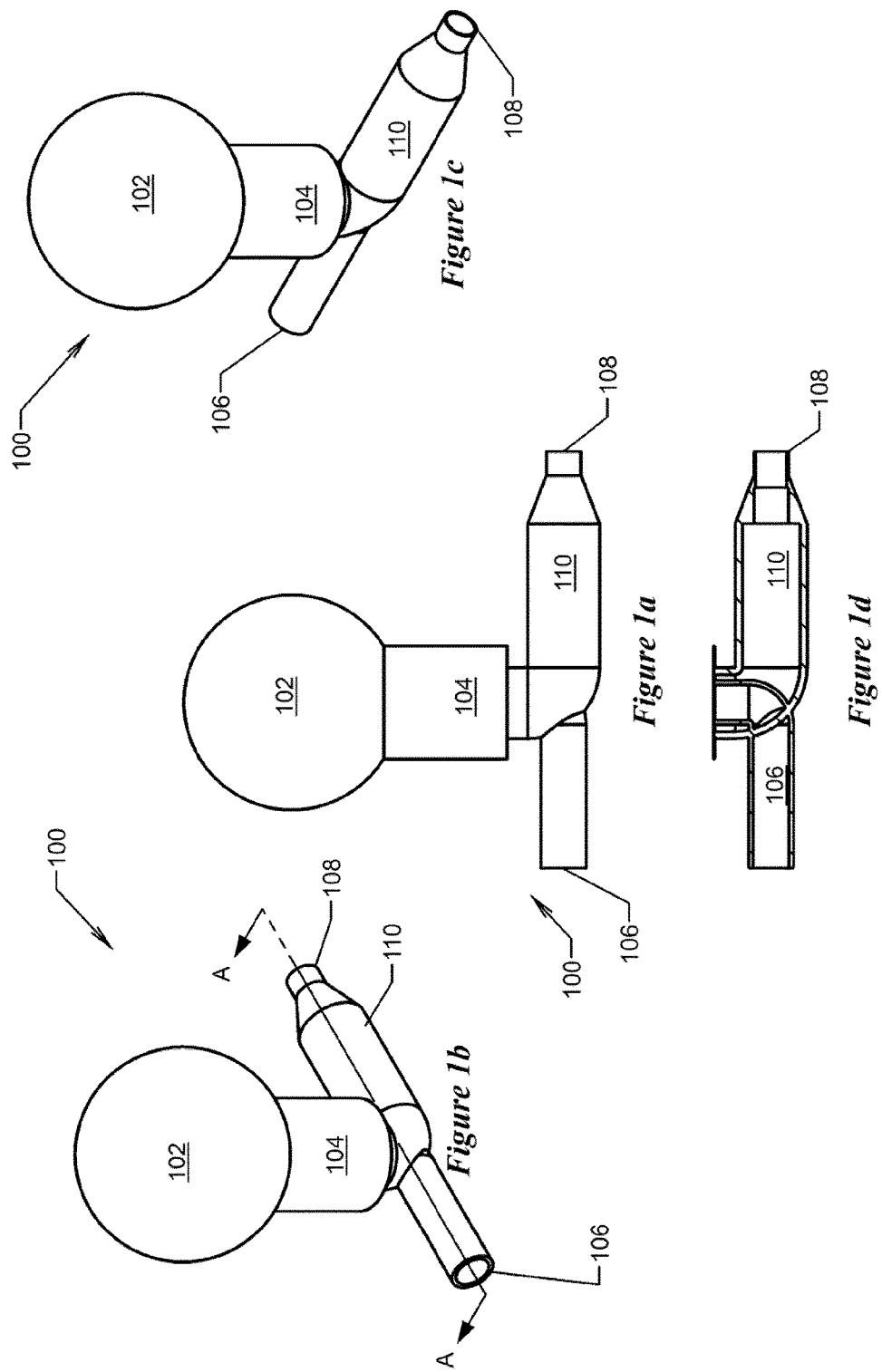

Table of Part Names and Reference Labels

| Numerically Sorted References | | Alphabetically Sorted References | |
|---|---|---|---|
| unit | 100 | actuator | 122 |
| float | 102 | air compartment | 150 |
| cylinder | 104 | atmospheric intake | 116 |
| input | 106 | bulkhead | 142 |
| output | 108 | cap | 408 |
| output reservoir | 110 | charging subsystem | 204 |
| low pressure reservoir | 112 | check valve | 418 |
| high pressure reservoir | 114 | cylinder | 104 |
| atmospheric intake | 116 | discharge valve | 416 |
| load | 118 | end position sensor | 628 |
| reverse osmosis pump | 120 | equalization valve | 144 |
| actuator | 122 | equalization valve | 524 |
| inlet | 124 | equalization valve | 624 |
| outlet | 126 | expulsion valve | 136 |
| tank | 128 | fastener | 412 |
| high pressure valve | 130 | feeder valve | 212 |
| low pressure valve | 132 | flange | 410 |
| suction valve | 134 | float | 102 |
| expulsion valve | 136 | frame | 500 |
| piston head | 138 | gasket | 148 |
| piston rod | 140 | gimbal | 504 |
| bulkhead | 142 | guide arm | 506 |
| equalization valve | 144 | high pressure reservoir | 114 |
| pass-through | 146 | high pressure valve | 130 |
| gasket | 148 | inlet | 124 |
| air compartment | 150 | inner sealed chamber | 400c |
| water compartment | 152 | input | 106 |
| sensor subsystem | 154 | input ducting | 516 |
| system | 200 | input ducting | 616 |
| operating subsystem | 202 | input valve | 520 |
| charging subsystem | 204 | input valve | 620 |
| large-capacity reservoir | 206 | large-capacity reservoir | 206 |
| machine | 208 | load | 118 |
| manifold | 210 | load piston rod | 608 |
| feeder valve | 212 | low pressure reservoir | 112 |
| sequestration module | 300 | low pressure valve | 132 |
| outer sealed chamber | 400a | machine | 208 |
| medial sealed chamber | 400b | manifold | 210 |
| inner sealed chamber | 400c | medial sealed chamber | 400b |
| piston chamber | 400d | operating subsystem | 202 |
| piston head | 402 | outer sealed chamber | 400a |
| piston rod | 404 | outlet | 126 |
| tube | 406 | output | 108 |
| cap | 408 | output ducting | 518 |
| flange | 410 | output ducting | 618 |
| fastener | 412 | output reservoir | 110 |
| piston head valve | 414 | output valve | 622 |
| discharge valve | 416 | pass-through | 146 |
| check valve | 418 | piston chamber | 400d |
| frame | 500 | piston head | 138 |
| reaction plate | 502 | piston head | 402 |
| gimbal | 504 | piston head | 512 |
| guide arm | 506 | piston head | 612 |
| piston rod | 508 | piston head valve | 414 |
| stage | 510 | piston rod | 140 |
| piston head | 512 | piston rod | 404 |
| piston tube | 514 | piston rod | 508 |
| input ducting | 516 | piston tube | 514 |
| output ducting | 518 | piston tube | 614 |
| input valve | 520 | reaction plate | 502 |
| equalization valve | 524 | reverse osmosis pump | 120 |
| load piston rod | 608 | sensor subsystem | 154 |
| stage | 610 | sequestration module | 300 |
| piston head | 612 | stage | 510 |
| piston tube | 614 | stage | 610 |

-continued

Table of Part Names and Reference Labels

| Numerically Sorted References | | Alphabetically Sorted References | |
|---|---|---|---|
| input ducting | 616 | start position sensor | 626 |
| output ducting | 618 | suction valve | 134 |
| input valve | 620 | system | 200 |
| output valve | 622 | tank | 128 |
| equalization valve | 624 | transition position sensor | 630 |
| start position sensor | 626 | tube | 406 |
| end position sensor | 628 | unit | 100 |
| transition position sensor | 630 | water compartment | 152 |

DETAILED DESCRIPTION OF SPECIFIC EMBODIMENTS

(a) Structure of Specific Embodiments

The structure of various aspects of the invention will now be illustrated by explanation of specific, non-limiting, exemplary embodiments shown in the drawing figures and described in greater detail herein.

FIGS. 1a-1d show a pressurization unit, embodying aspects of the present invention, generally illustrated at 100. The unit 100 may be placed in an energy field such that the energy field acts upon the unit 100 to operate it. For example, the unit 100 may have a float 102 and may be anchored partially submerged in a body of water such that waves on the body of water act upon the float 102.

The unit 100 has a pressurizing cylinder 104 operably connected to the float 102 to receive kinetic energy there from. The cylinder 104 has an input 106 for receiving fluid to be pressurized and an output 108 for supplying pressurized fluid that has been pressurized by the cylinder 104. The output 108 may include an output reservoir 110 for storing pressurized fluid to be supplied. Valves, for example check valves, and other known control means may be deployed in the input 106, the output 108, the output reservoir 110, or the cylinder 104 itself, to guide fluid flow in a forward direction from the input 106 to the output 108.

Figure 2:
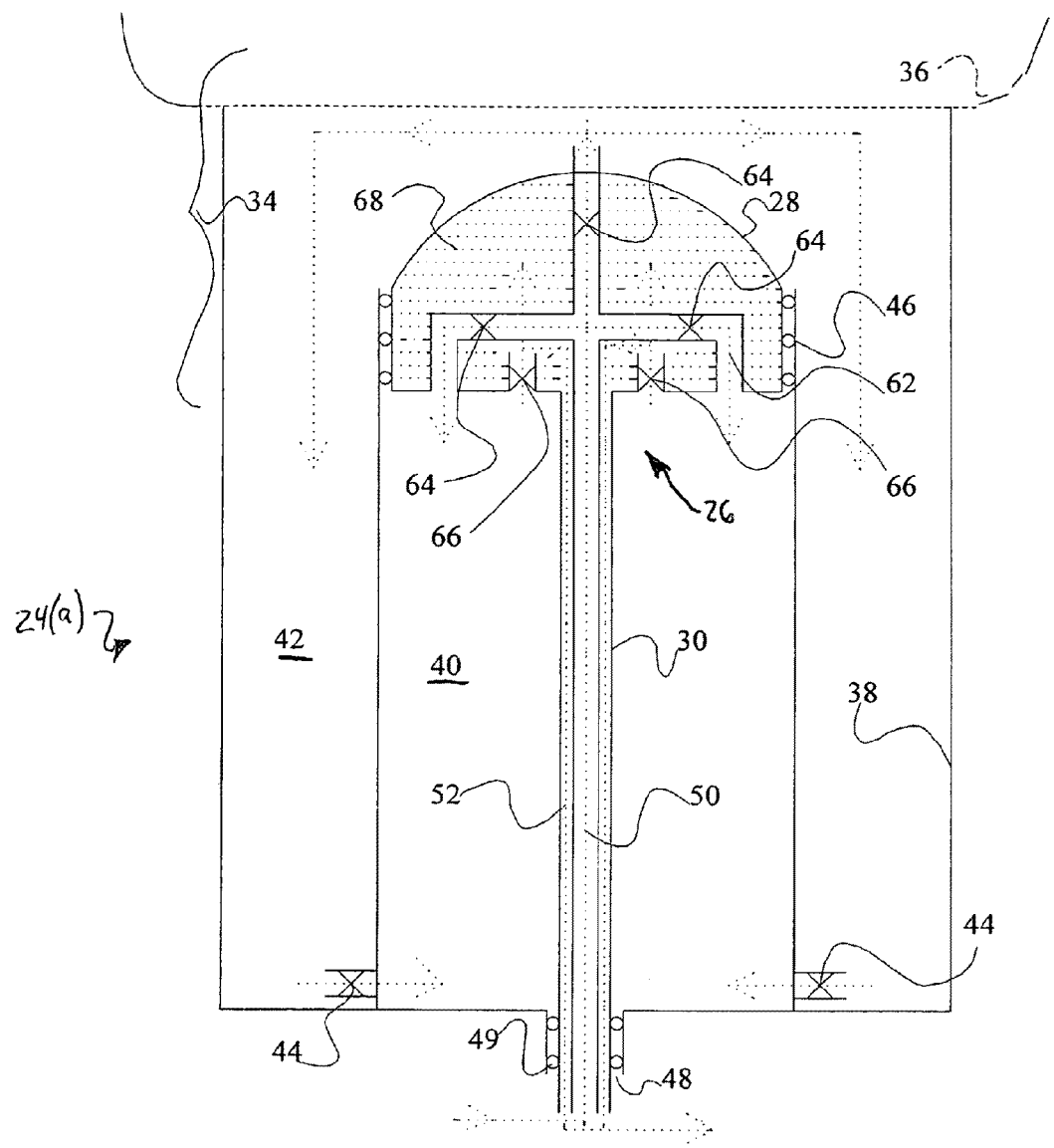
FIG. 2 is a reproduction of FIG. 3 of the applicant's U.S. Pat. No. 7,690,900, illustrating one way to configure the cylinder of FIG. 1 to compress a gas fluid, for example air.
Figure 3:
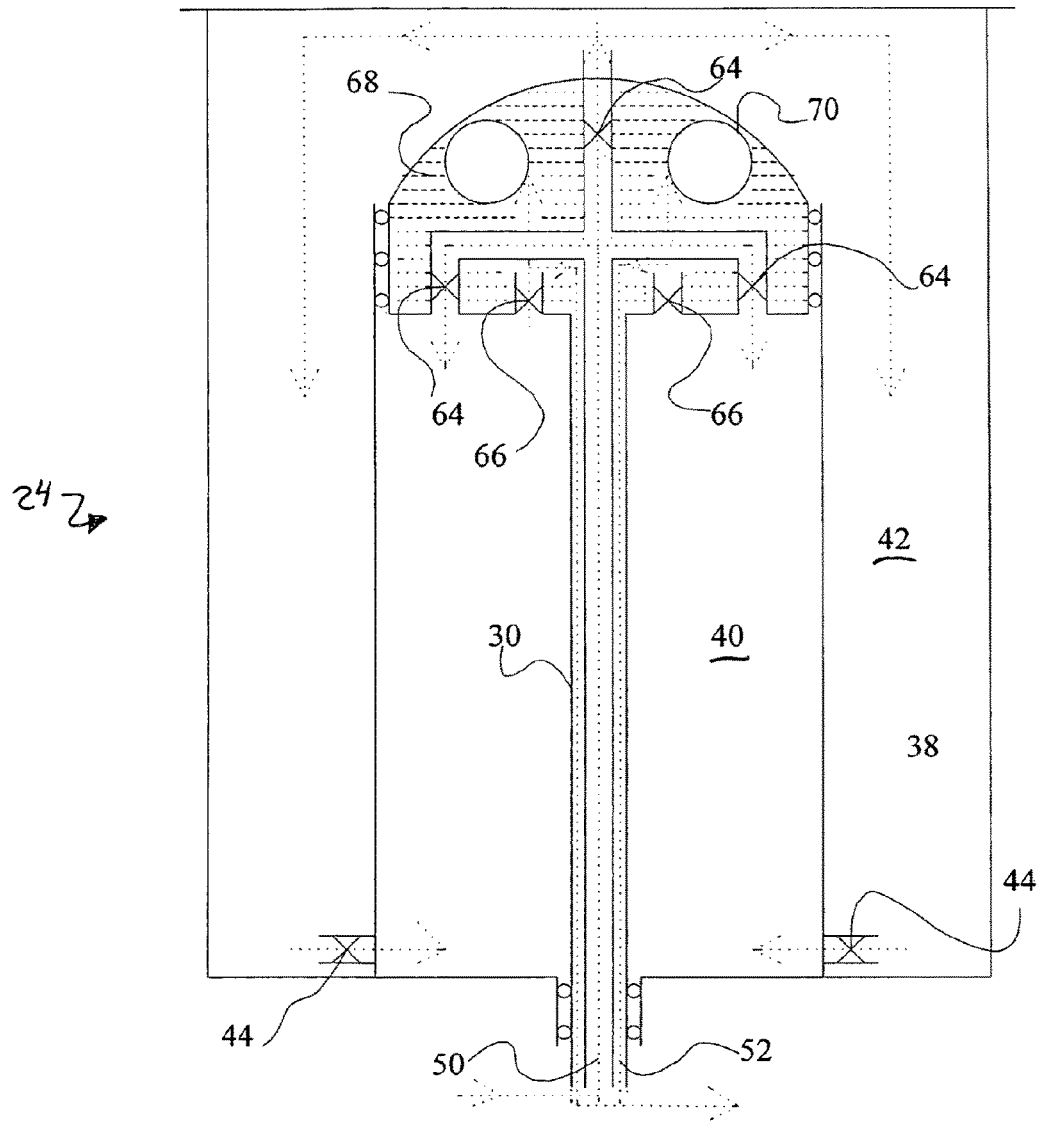
FIG. 3 is a reproduction of FIG. 4 of the applicant's U.S. Pat. No. 7,690,900, illustrating one way to configure the cylinder of FIG. 1 to pressurize a liquid fluid, for example water.

FIG. 2 shows one known way to configure the cylinder 104 to compress a gas fluid, for example air, as taught in the applicant's issued U.S. Pat. No. 7,690,900. FIG. 3 shows one known way to configure the cylinder 104 to pressurize a liquid fluid, for example water, as also taught in the applicant's issued U.S. Pat. No. 7,690,900. The reference numbers in FIGS. 2 and 3 correspond to the description in U.S. Pat. No. 7,690,900 and not to the description herein. Those skilled in the art will recognized that in such configurations, fluid is conveyed from the input 106 into the cylinder 104 to the output 108 through a piston rod in the cylinder 104, as best seen in FIGS. 1d, 2, and 3.

For simplicity, the following description will focus mainly on gas compression embodiments; however, those skilled in the art will easily appreciate equivalent liquid pressurization embodiments, such that the teachings extend to pressurizing any suitable pressurizable fluid, for example a compressible gas or a pressurizable liquid.

Figure 4A:
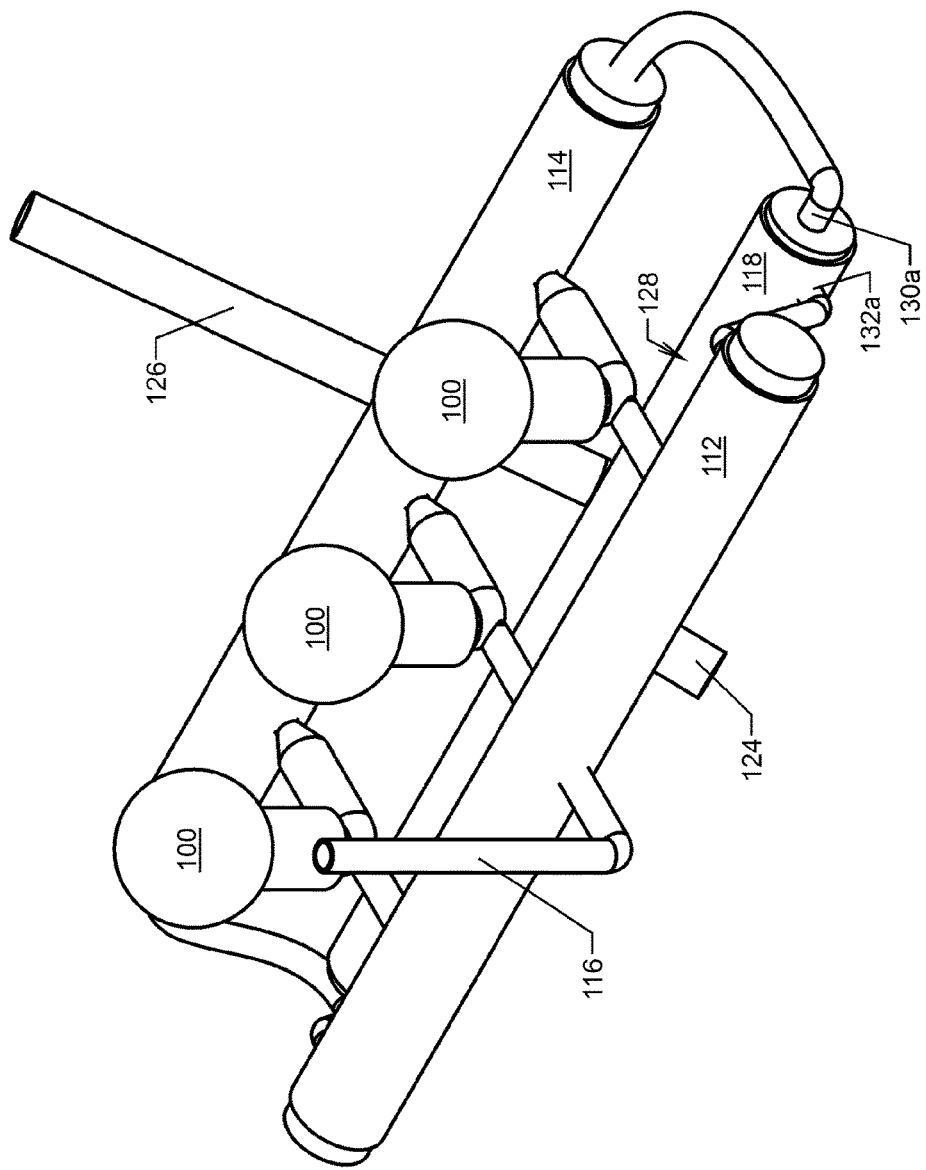
FIG. 4a is a top-front-left isometric view of a system of pressurization units of FIG. 1 connected together in parallel between a low pressure reservoir and a high pressure reservoir to power a load.
Figure 4B:
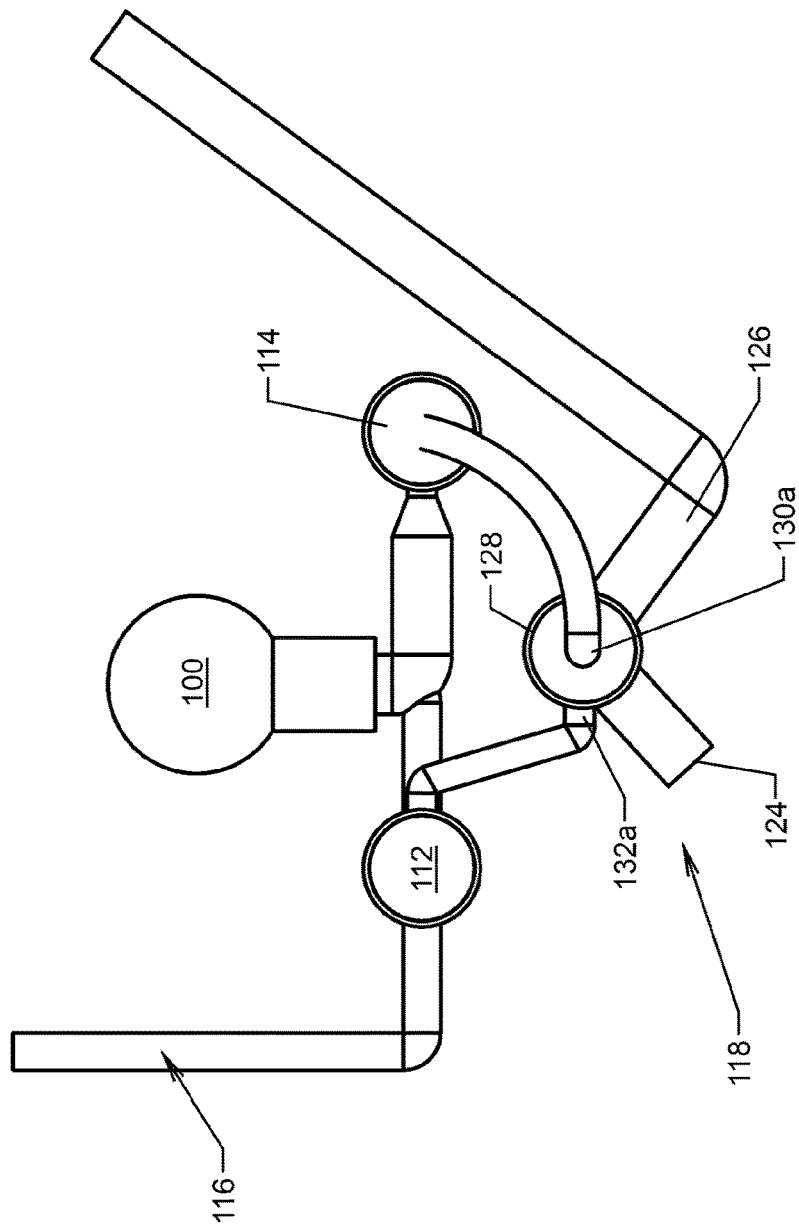

FIGS. 4a & 4b show multiple pressurization units 100 connected together in parallel to receive air from a low pressure reservoir 112 at their respective inputs 106, for compression within their respective cylinders 104 and supply to a high pressure reservoir 114 via their respective outputs 108, perhaps through respective output reservoirs 110. The low pressure reservoir 112 is connected to an atmospheric intake 116 for initial charging and ongoing replenishment of air at atmospheric pressure, for example to replenish air lost to leakage or drawn-off to power ancillary equipment, for example a fog horn.

A load 118 is operably connected to receive compressed air from the high pressure reservoir 114, for expansion at the load 118 and return to the low pressure reservoir 112, such that the expanding air performs work at the load 118. In this regard, as illustrated the load 118 might be a pump configured to draw in salt water through an inlet 124 and expel salt water through an outlet 126. Another example of a load 118 would be a generator.

Such parallel configurations present design and implementation challenges. High pressure is needed at the high pressure reservoir 114 to effectively power the load 118 using practically sized components. However, it is difficult to compress atmospheric air to sufficiently high pressure with a single stage of pressurization units 100; pressurization units 100 that are scaled for that result fail to harness most of the incident wave energy.

Figure 5A:
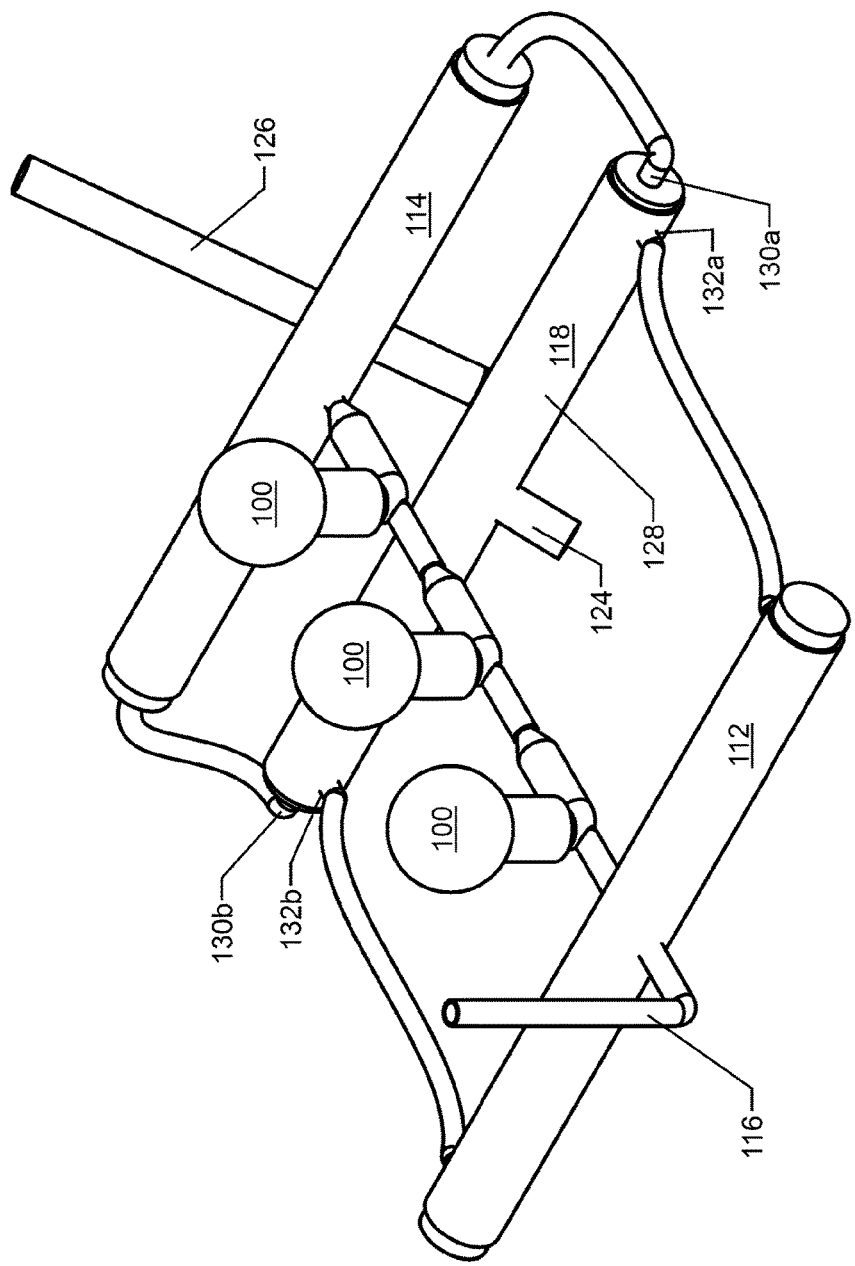
FIG. 5a is a top-front-left isometric view of a system of pressurization units of FIG. 1 connected together in series between a low pressure reservoir and a high pressure reservoir to power a load.
Figure 5B:
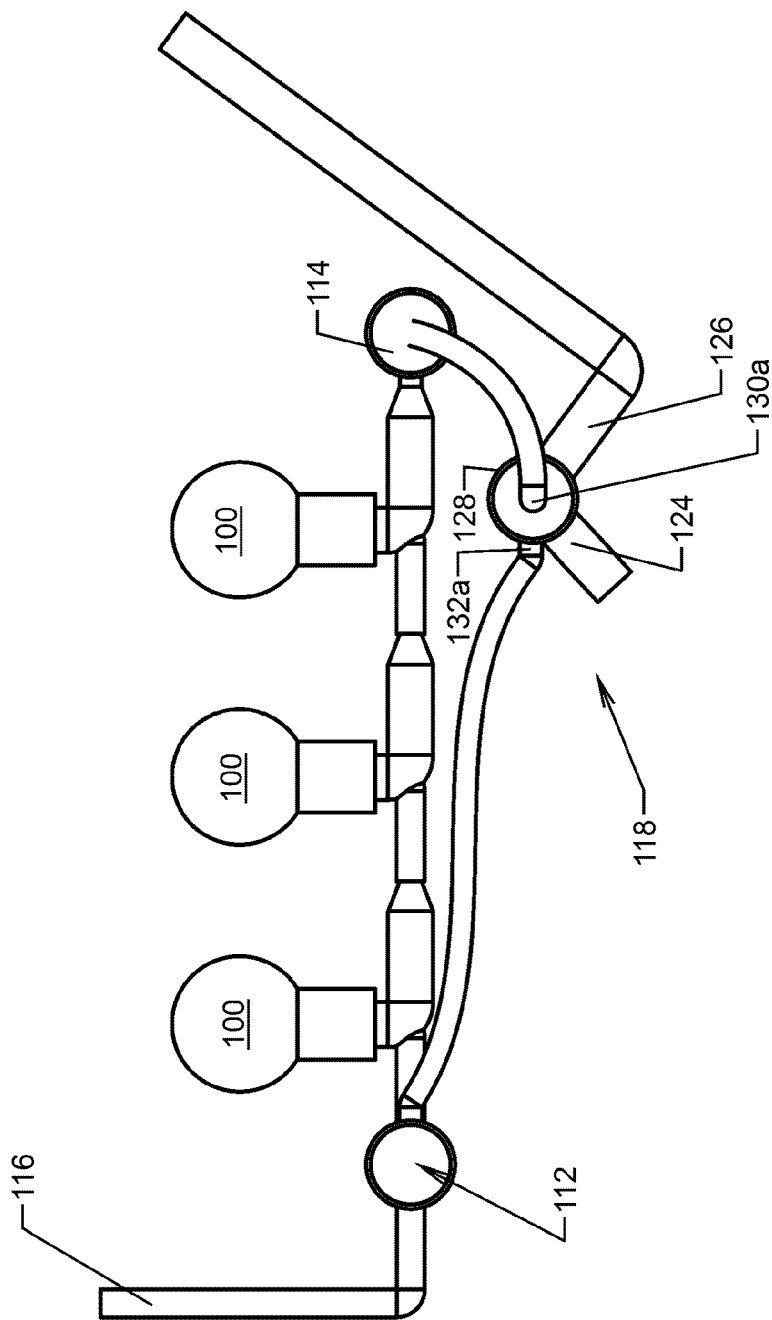
Figure 6A:
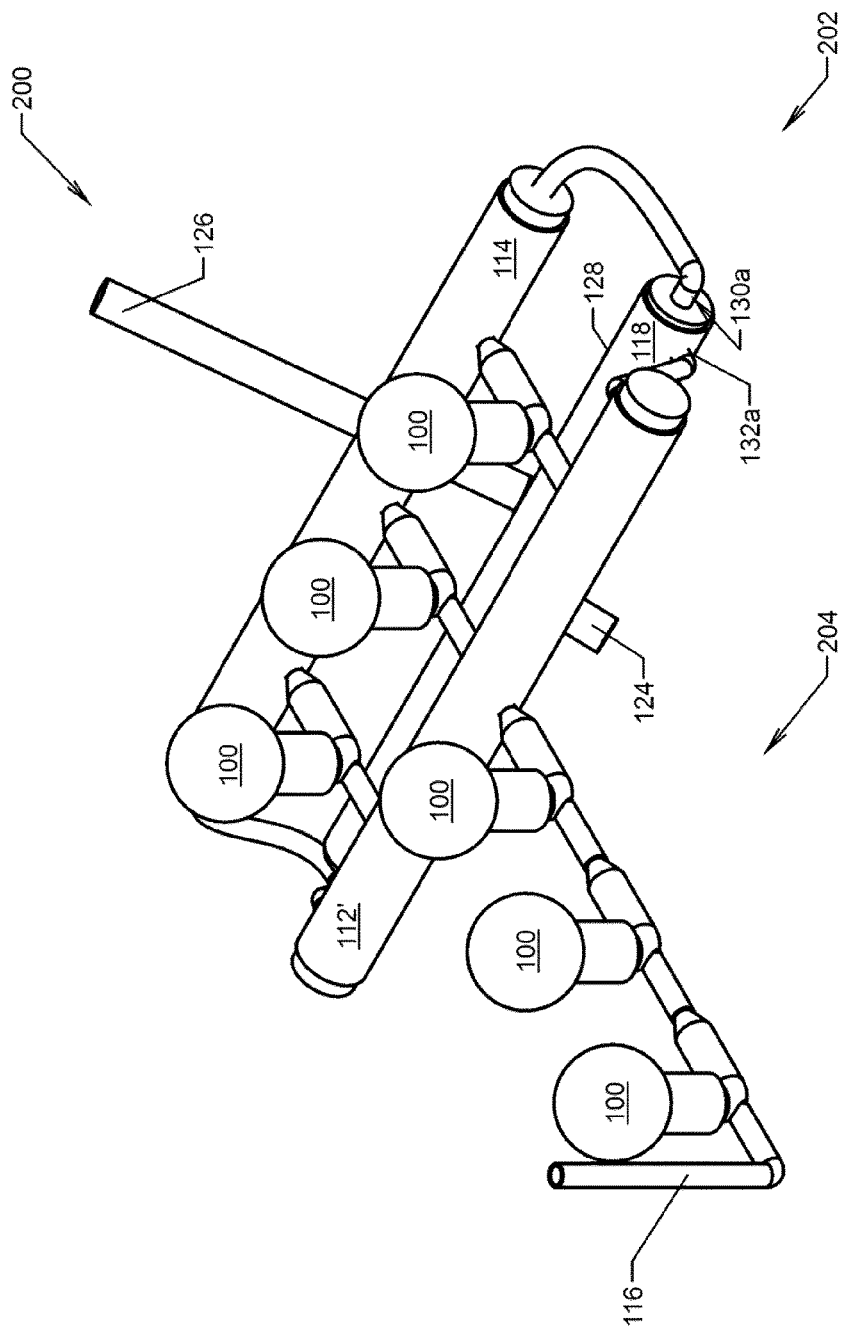
FIG. 6a is a top-front-left isometric view of a system of pressurization units of FIG. 1, a first group of the pressurization units being connected together in series to a low pressure reservoir as a charging subsystem and a second group of the pressurization units being connected together in parallel between the low pressure reservoir and a high pressure reservoir as an operating subsystem to power a load.
Figure 6B:
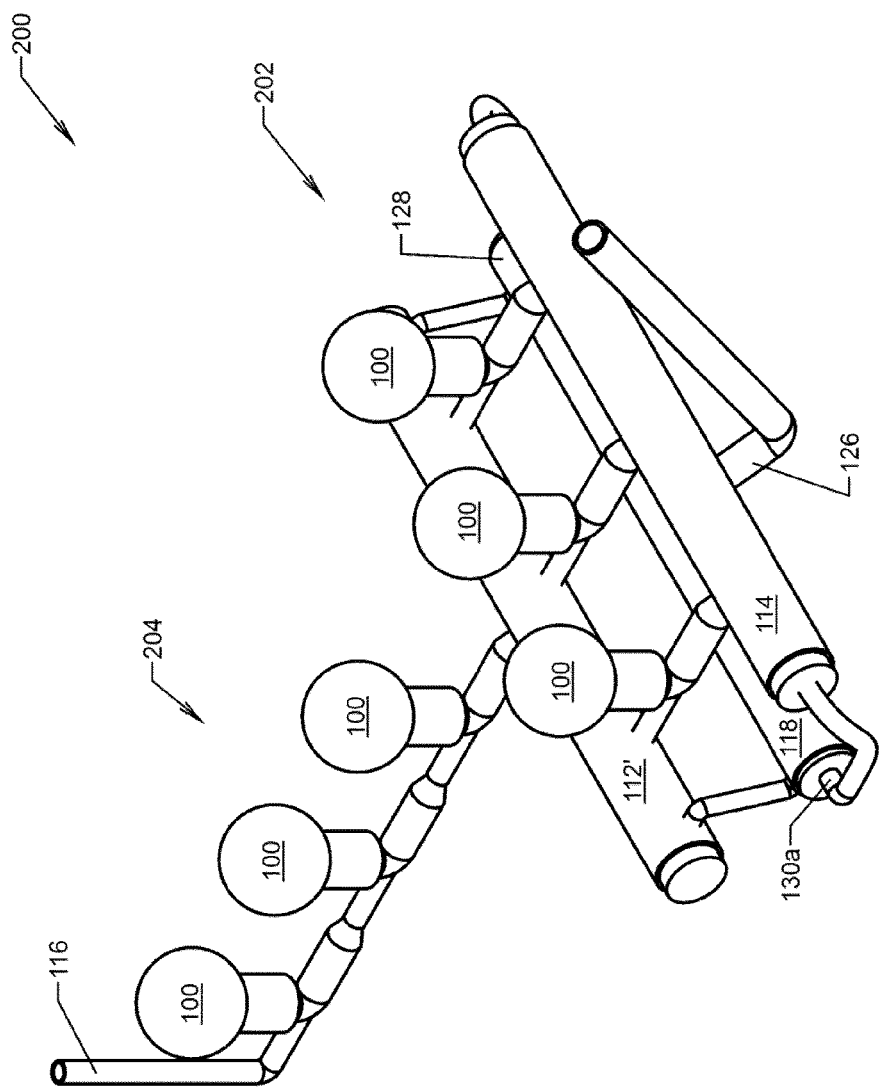
Figure 6C:
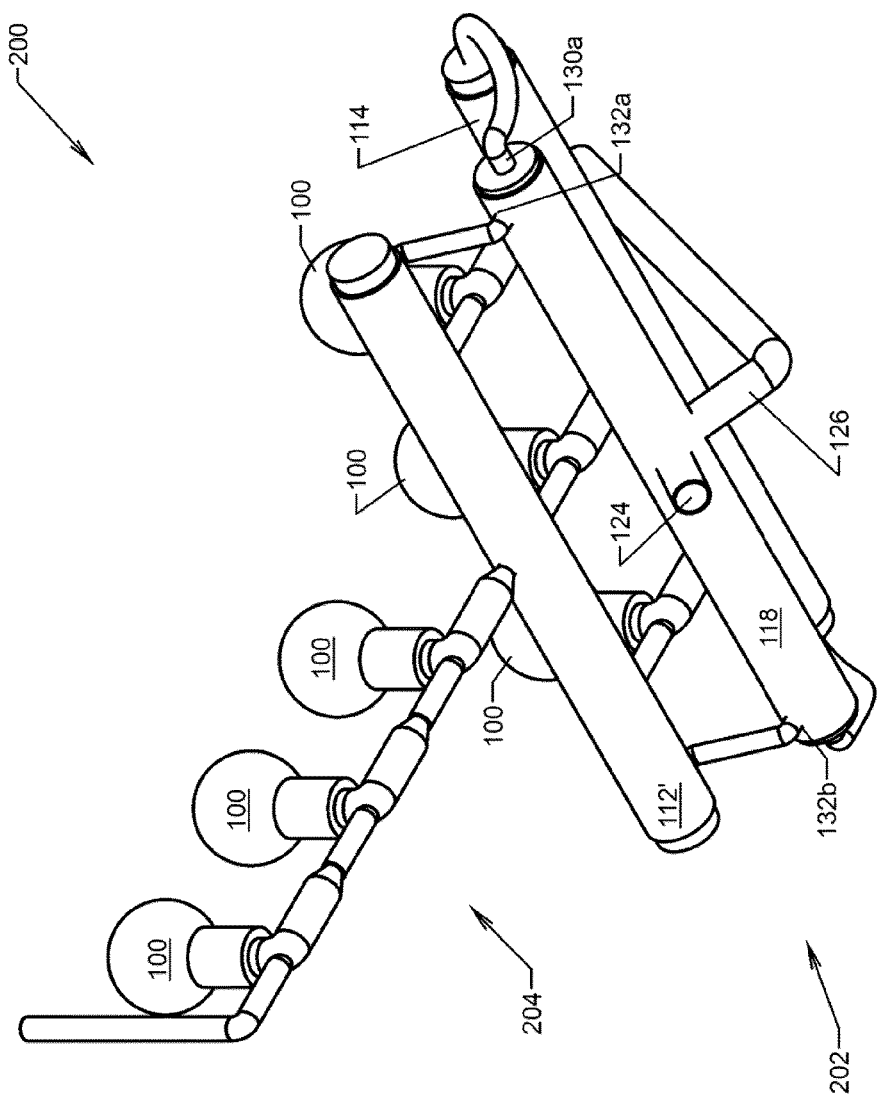
Figure 6D:
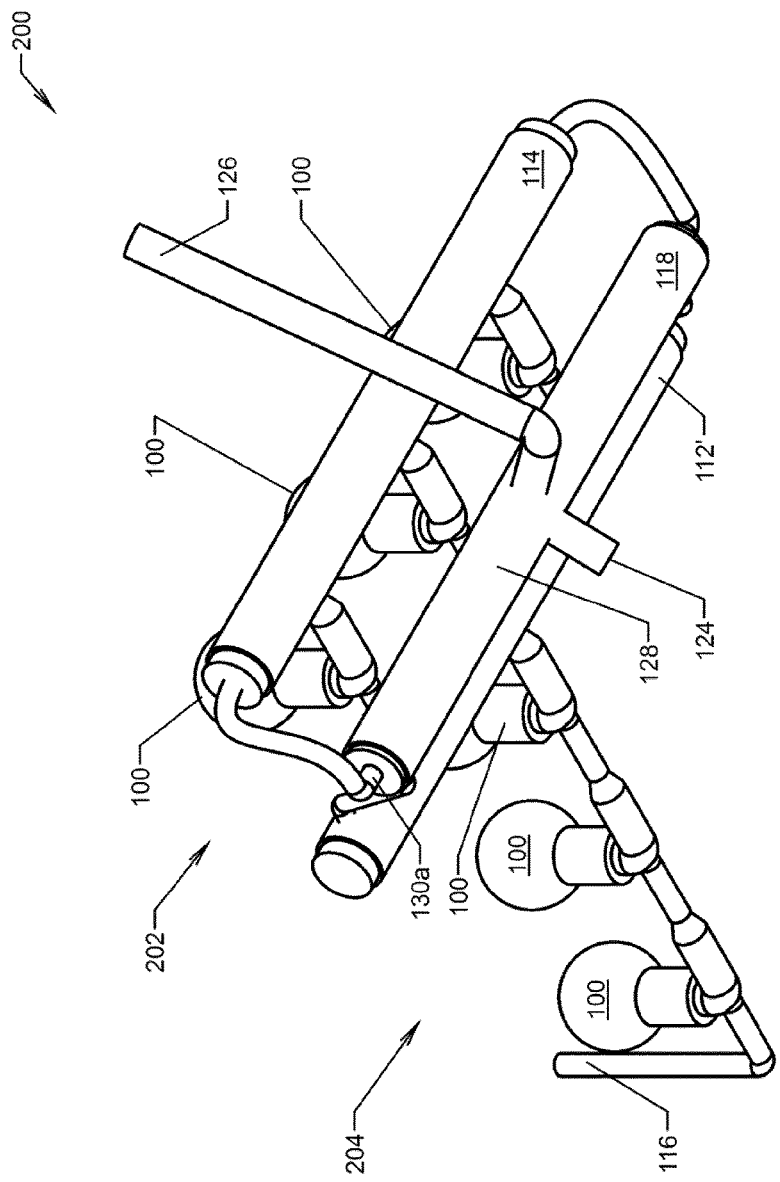
Figure 6E:
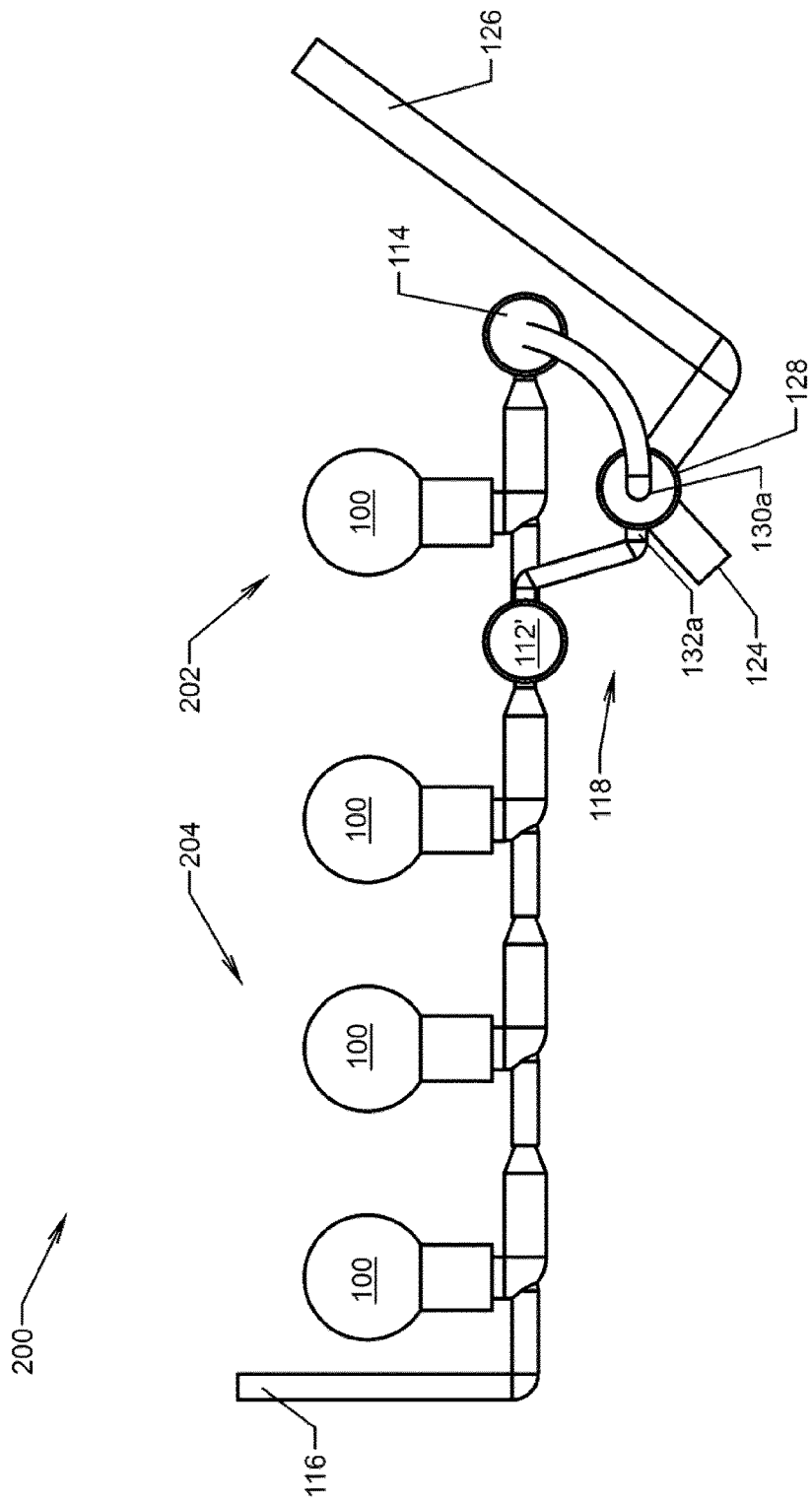
Figure 6F:
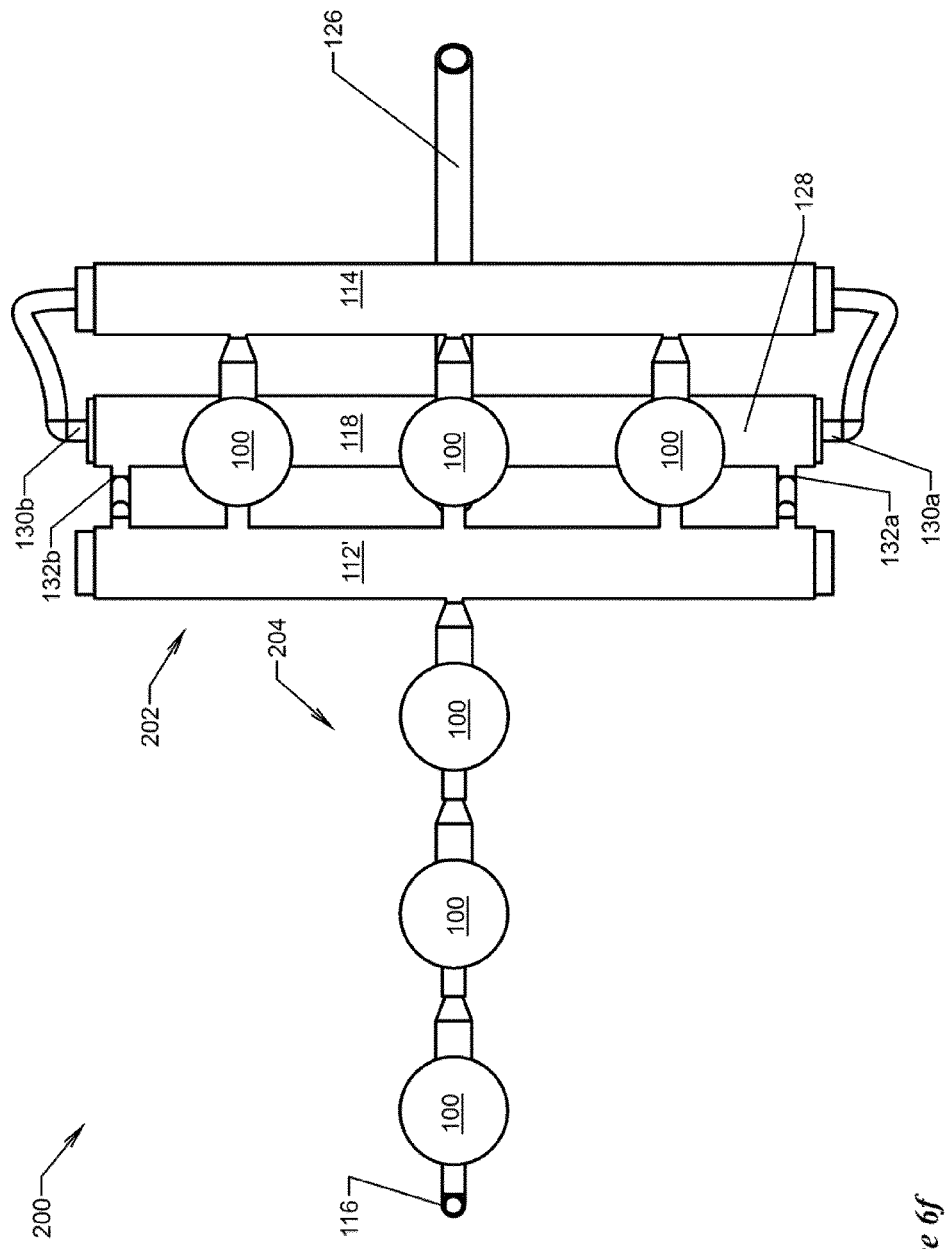
Figure 6G:
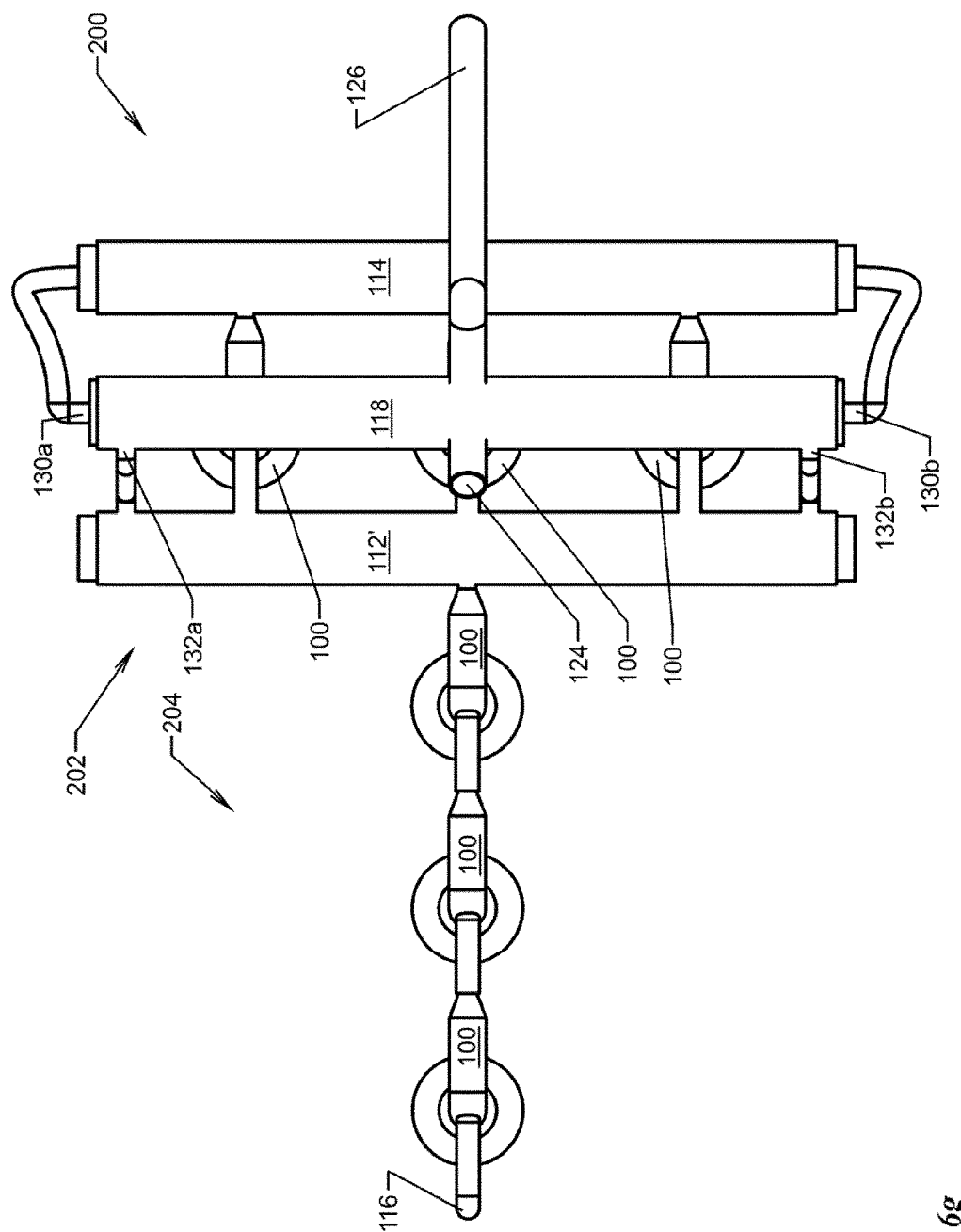
Figure 6H:
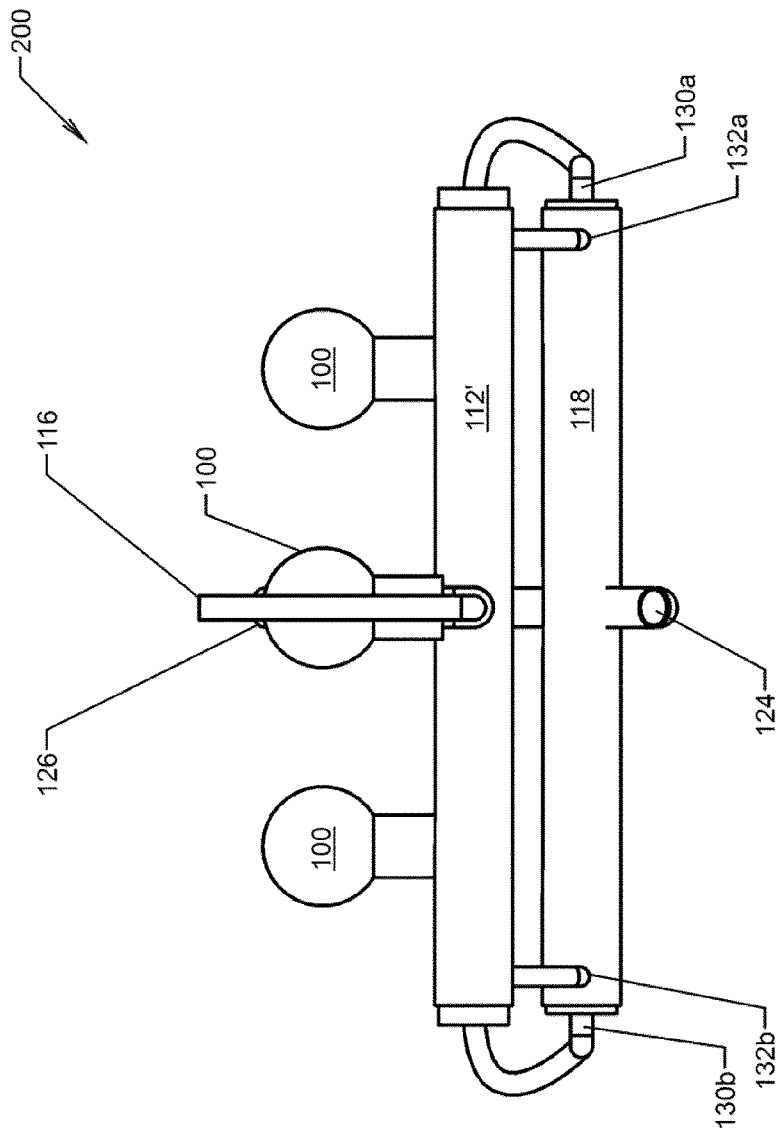
Figure 6I:
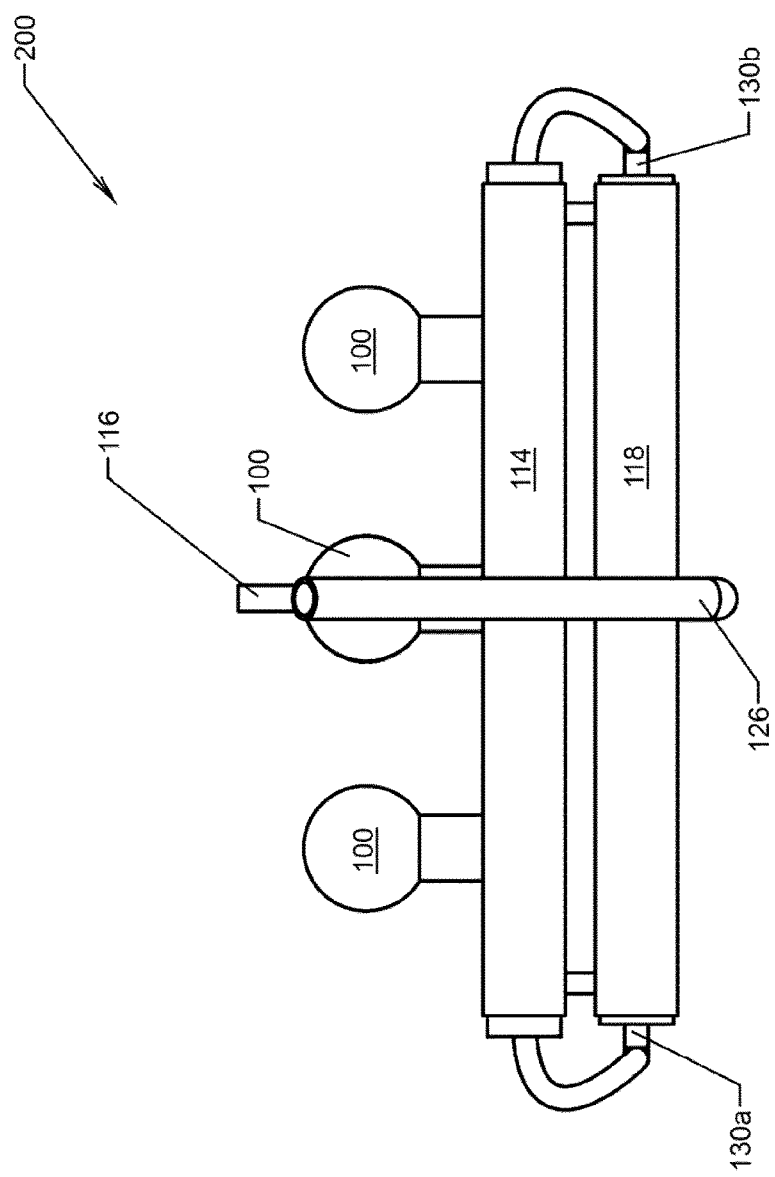

A system that addresses these challenges is shown in FIGS. 5a & 5b, where multiple pressurization units 100 are connected together in series between the low pressure reservoir 112 and the high pressure reservoir 114. The first unit 100 in the series is connected to receive air from the low pressure reservoir 112 at its input 106, for compression within its cylinder 104 and supply at its output 108, perhaps through an output reservoir 110. Each successive unit 100 in the series is connected to receive air from the preceding unit 100 and to supply air compressed to a yet higher pressure to the following unit 100, until the last unit 100 in the series, which is connected at its output 108 to supply air to the high pressure reservoir 114. The low pressure reservoir 112 is connected to the atmospheric intake 116, for example through a check valve (not shown), for initial charging and ongoing replenishment of air at atmospheric pressure.

The load 118 is operably connected to receive compressed air from the high pressure reservoir 114, for expansion at the load 118 and return to the low pressure reservoir 112, such that the expanding air performs work at the load 118.

Because in this series-connected embodiment the air is compressed from the low pressure reservoir 112 to the high pressure reservoir 114 in a number of stages, it is practical to achieve sufficiently high pressures and to do so with units 100 that are efficient for a wider range of incident waves than for a single-stage embodiment, such as the parallel-connected embodiment of FIGS. 4a and 4b.

Nevertheless, series configurations also present design and implementation challenges. One challenge is that expanding compressed air at the load 118 from such a high pressure to a low pressure (e.g. atmospheric pressure) can produce a tremendous heat sink that can freeze proximate apparatus.

As an example, compression of air from an atmospheric pressure of 14.7 psia to a compressed pressure of 2700 psia could result in a temperature increase of 992° C., calculated as:

$$\Delta T = T_c - T_a = \left[ T_a \times R^{\frac{(K-1)}{K}} \right] - T_a$$

where:

$T_c$ is the temperature of the compressed air in degrees Rankine, $T_a$ is the temperature of the ambient air in degrees Rankine (in this case 520 °R. = 15.7 °C.), -continued $R$ is the compression ratio $\left(\text{in this case} \frac{2700}{14.7} = 184\right)$, $K$ is $\frac{\text{Heat Capacity at Constant Pressure}}{\text{Heat Capacity at Constant Temperature}} = \frac{C_P}{C_V} = 1.4$ for air, $T_{[°C.]} = (T_{[°R]} - 491.67) \times \left(\frac{5}{9}\right)$, and, $\Delta T_{[°C.]} = \left(\frac{5}{9}\right) \Delta T_{[°R]}$ Similarly, expansion of air from a compressed pressure of 2700 psia to an atmospheric pressure of 14.7 psia could result in a corresponding temperature decrease of 992° C.

Even in a large body of water, such a temperature differential has to be dissipated over space and/or time or compensated for with a heat sink or heat source as appropriate.

A series-parallel system that embodies aspects of the present invention and addresses the challenges presented by parallel configurations and the challenges presented by series configurations is shown generally at 200 in FIGS. 6a-6i. This series-parallel system 200 includes a parallel operating subsystem 202 that is charged (and maintained) by a series charging subsystem 204.

The operating subsystem 202 has an almost identical topology to the system illustrated in FIGS. 4a & 4b, however, instead of being charged via an atmospheric intake 116, the operating subsystem 202 is charged at a higher pressure by the charging subsystem 204.

The charging subsystem 204 has a similar topology to the system illustrated in FIGS. 5a & 5b, however, instead of compressing atmospheric air for supply to the high pressure reservoir 114, the charging subsystem 204 is instead connected to supply a low pressure reservoir 112'. The low pressure reservoir 112' and the high pressure reservoir 114 might be pneumatic service units, for example.

In such a series-parallel system 200, the expansion of gas at the load 118 occurs between a high pressure that is maintained by the high pressure reservoir 114 and a lower pressure that is still well above atmospheric pressure, which is maintained by the low pressure reservoir 112'. This high pressure operating range permits the use of practically sized system components.

Because, unlike the multi-stage embodiment illustrated in FIGS. 5a and 5b, this expansion occurs, for example, over just one compression stage, the resulting temperature differential is sufficiently modest to reduce the probability and amount of freeze-up. For an expansion ratio of 1:1.5 for example, the temperature differential (whether compression increase or expansion decrease) would be a very manageable 35° C.

To compensate for a smaller pressure differential during single-stage expansion compared to the multi-stage expansion illustrated in FIGS. 5a & 5b, a higher volume of air is provided by using multiple parallel-connected units 100 in the operating subsystem 202. It has been found that, for example, using a similar or even equal number of parallel-connected and series-connected units 100 provides suitable throughput.

There are also advantages for economy of scale manufacturing and parts inventory (e.g. for repair) to be derived from building the system 200 from standardized series-connected units 100 in the charging subsystem 204 and substantially identical parallel-connected units 100 in the operating subsystem 202. In this regard, standardized units would have a general configuration and some parts in common, but some other parts would differ in scale for operation over different pressure ranges. Those skilled in the art will recognize that well-understood adjustments to a unit 100, for example adjustments to the buoyancy of its float 102 or the geometry of its cylinder 104, can tailor the unit 100 for use at a desired input pressure, output pressure, compression ratio, throughput, or otherwise, without necessitating departure from a standardized configuration.

For clarity of illustration, FIGS. 6a-6i show three series-connected units 100 and three parallel-connected units 100; however, those skilled in the art will recognized that other numbers of units would be possible and desirable.

By way of further illustration, operating values have been tabulated in FIG. 9 for a system 200 with up to fourteen compression stages that is placed in a body of sea water having waves with an average amplitude of 12 feet and a frequency of 0.1 Hertz, in which each unit 100 has:

a float 102 of 25 foot diameter and 491 square foot cross-sectional area that in steady state is submerged 3 feet into the surrounding sea water having a density of 64.5 pounds per cubic foot, such that the float 102 displaces a volume of 1473 cubic feet of sea water weighing about 95,000 pounds to produce a net buoyant force of about 95,000 pounds, and a cylinder 104 that is characterized by a nominal compression ratio of 1.5:1 and a total piston travel of 9 feet, being equal to the average wave amplitude of 12 feet less the steady-state float 102 submergence of 3 feet.

Thus for example, such a system 200 might have a charging subsystem 204 with twelve series-connected units 100 that charges the low pressure reservoir 112' to a pressure of 1800 psia and an operating subsystem 202 with twelve parallel-connected units 100 that supplies the high pressure reservoir 114 with air at a pressure of 2700 psia in sufficient quantity to power a practical load 118.

As used herein, the relative term high pressure means a pressure that is sufficient to practically power a load and the relative term low pressure means a pressure that is lower than the high pressure. For the exemplary 13-stage system 200 described above, 2700 psia would be considered a high pressure and 1800 psia would be considered a low pressure. For a 12-stage system 200 built in accordance with the parameters of FIG. 9, 1800 psia would be considered a high pressure and 1200 psia would be considered a low pressure.

Those skilled in the art will easily recognize the adaptations to build and use equivalent embodiments that pressurize a liquid, for example water, as opposed to compressing a gas. The pressurization units 100 could be configured in accordance with FIG. 3 as opposed to FIG. 2 and still have a pressurization ratio of 1.5:1. The low pressure reservoir 112' and the high pressure reservoir 114 might be embodied as hydraulic accumulators, for example gas-pressurized or spring-loaded accumulators.

Those skilled in the art will appreciate that, while the embodiment of the operating subsystem 202 illustrated in FIGS. 6a-6i shows a closed-loop configuration with a load 118, some aspects and benefits of the invention would be present in open-loop configurations. Furthermore, some embodiments of the operating subsystem 202 (and hence the system 200 as a whole) might not include a load 118, which might be available separately for subsequent connection, temporary or otherwise, to the operating subsystem 202 to be powered by the system 200, already charged and ready to supply.

Those skilled in the art will appreciate the contrast between the output power of a 14-stage system 200 built in accordance with the teachings herein and the output power of a notional equivalent system that provides the same compression directly in one stage.

FIGS. 7a-7g detail one possible load 118, in this embodiment a reverse osmosis pump 120 that has a pneumatic actuator 122 and draws in ambient salt water through its inlet 124 and expels pressurized salt water through its outlet 126, for supply to a reverse osmosis filtration system (not shown).

The actuator 122 has a tank 128 that is connected to receive high pressure air from the high pressure reservoir 114 through opposing first and second high pressure valves 130a, 130b and connected to return expanded air to the low pressure reservoir 112' through first and second low pressure valves 132a, 132b. The tank 128 is further connected to receive ambient salt water at the inlet 124 through medial, lateral, first and second suction valves 134a, 134b and to supply pressurized salt water at the outlet 126 through medial, lateral, first and second expulsion valves 136a, 136b.

As best seen in FIGS. 7f & 7g, the tank 128 slidably houses opposing first and second piston heads 138a, 138b connected together by a single piston rod 140 that extends between them. The interior of the tank 128 is transversely bisected by a bulkhead 142 having first and second equalization valves 144a, 144b and a leak-resistant pass-through 146, for example reinforced with a gasket 148, adapted to accept the piston rod 140 for slidable passage therethrough.

Those skilled in the art will recognize that the tank is therefore sealingly divided into distinct first and second air compartments 150a, 150b and distinct first and second water compartments 152a, 152b by the piston heads 138 and the bulkhead 142.

The actuator 122 also includes a sensor subsystem 154 to detect when the piston heads 138a, 138b are positioned at the beginning and end of their transit and when they are positioned to transition from a transfer stroke to a reset stroke, and to generate corresponding signals in response to signal to the foregoing valves when they should open or close, as will be discussed further below.

Figure 8:
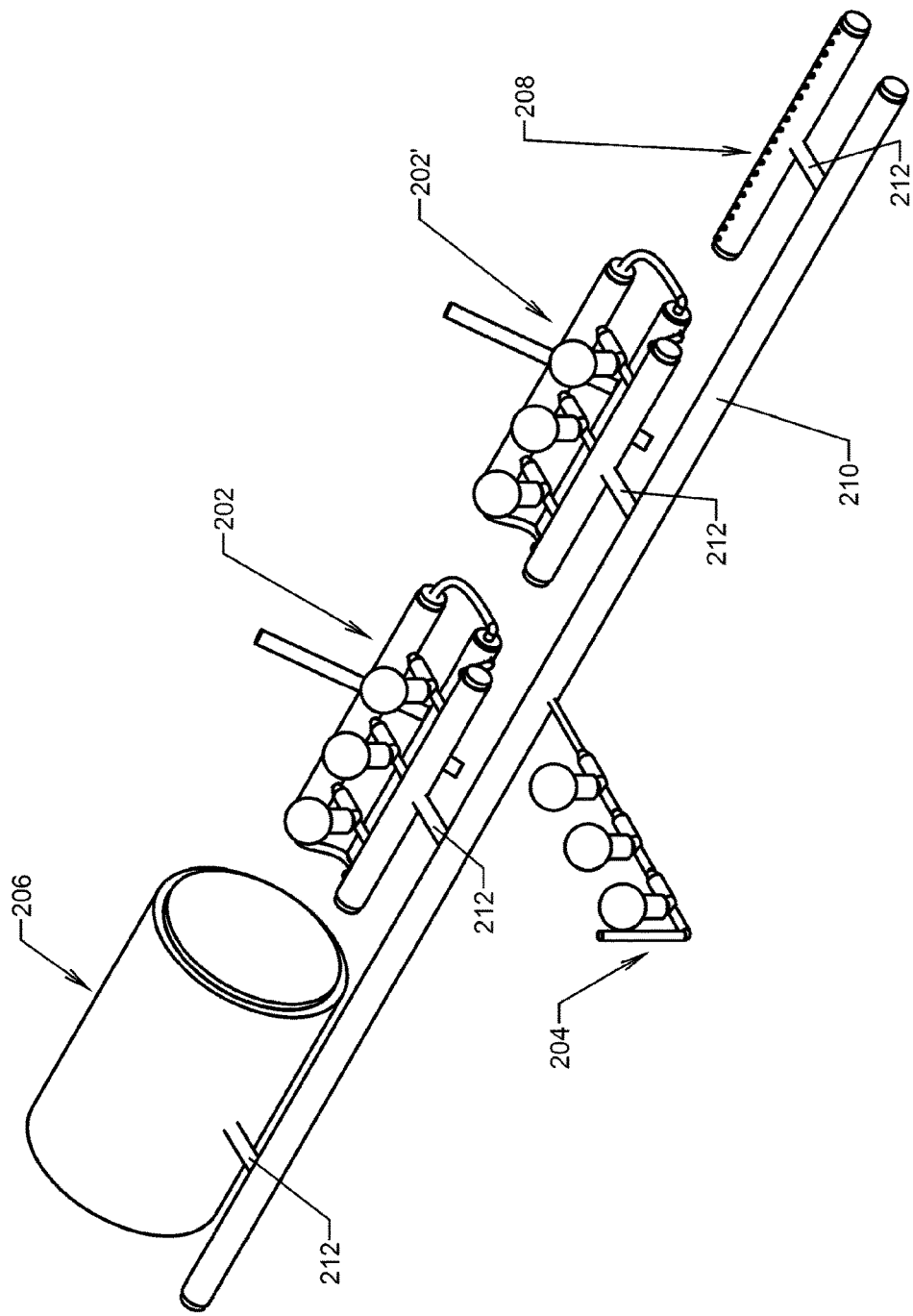
FIG. 8 is a top-front-left isometric view of the system of FIG. 6a, expanded to include a second operating subsystem, a large-capacity reservoir, and a machine.

FIG. 8 shows a second embodiment system 200', which is characterized by further parallelization. Those skilled in the art will recognize that after the operating subsystem 202 has been initially charged, the charging subsystem 204 is likely to have spare pressurizing capacity. Therefore, the system 200' may be expanded such that the charging subsystem 204 can in parallel charge and maintain one or more additional operating subsystems 202'. Additionally, the charging subsystem 204 might in parallel supply a large-capacity reservoir 206 or a machine 208, illustrated here as a simple air injector for addressing hypoxia in the surrounding water; although, the machine 208 might be any fluid-powered machine, including a generator. By extension, a remote operating subsystem (not shown) might be charged by delivering the charging subsystem 204 or the large-capacity reservoir 206 to it as needed.

This parallelized supply could be distributed through a manifold 210 and respective feeder valves 212 that manually or automatically (for example in response to differential pressure) open or close to pass or block pressurized fluid from the charging subsystem 204. Those skilled in the art will recognize that the term manifold connotes a conduit without significant storage capacity, in contrast to a reservoir that does have significant storage capacity.

Figure 10:
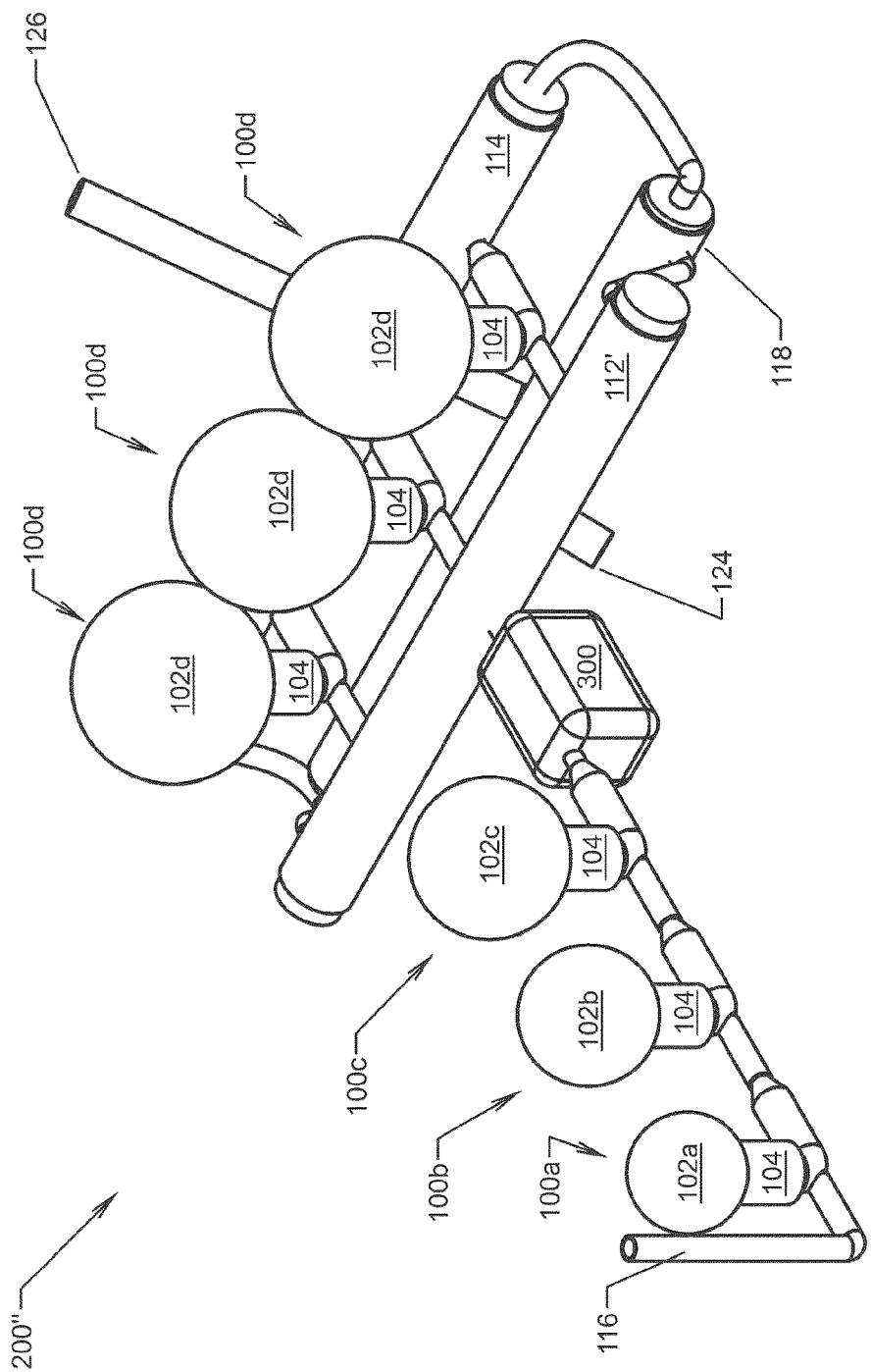
FIG. 10 is a top-front-left isometric view of a second embodiment of the system of FIG. 6a, in which each pressurization unit has a standard cylinder suspended from a tailored float, and further including a sequestration stage, as illustrated between the charging subsystem and the operating subsystem.

FIG. 10 shows a third embodiment system 200" system that is similar to the first embodiment system 200 except in two respects.

The third embodiment system 200" teaches the use of units 100a, 100b, 100c, 100d, that have identical cylinders 104 but different floats 102a, 102b, 102c, 102d, which are tailored to the operating pressure ranges of their respective cylinders. In other words by tailoring parameters, for example the diameter and submergence of the floats 102a, 102b, 102c, 102d, one can benefit from economies of scale by deploying uniform cylinders 104 and tailoring the applied buoyant force to the respective operating pressure range. One example of such tuning is tabulated in FIG. 11.

Thus for any two pressurizing units pressurizing fluid in two different pressure ranges, the float of the one pressurizing unit pressurizing fluid in the higher pressure range would exert a buoyant force at least as large as does the float of the other pressurizing unit. This might be accomplished if the float of the one pressurizing unit pressurizing fluid in the higher pressure range had a diameter at least as large as does the float of the other pressurizing unit or were submerged at least as deep as is the float of the other pressurizing unit.

It is to be noted that by reducing the buoyant forces in the charging subsystem 204, the dimensions of the cylinders 104 can be reduced. One downside is that, although a nominal compression ratio, for example 1.5:1, may be sought overall, an arrangement with reduced buoyancy does not provide the full required output volume, which in turn means that it will take longer for the charging subsystem 204 to charge the operating subsystem 202 because more lower-volume cycles will be needed. Yet, by trading off some of this "time" parameter, one can deploy a standard size cylinder 104 for all charging subsystem 204 stages, and then continue with this same size cylinder 104 for all subsequent operating subsystem 202 stages, yielding economy of scale advantages.

The third embodiment system 200" also teaches the inclusion of a sequestration module 300, in this case a $CO_2$ sequestration module connecting the charging subsystem 204 to the operating subsystem 202. Those skilled in the art will recognize that many well-known sequestration processes would be suitable for integration into the system 200" by the sequestration module 300; for sequestration processes that have higher efficiency when the feedstock is pressurized, such an arrangement could be particularly beneficial.

Depending on the sequestration process, the sequestration module 300 might include ports (not shown) for input of reactants and output of resultants, including output to the surrounding environment. The system 200" thus can make available to the sequestration module 300 air and water at desired pressures and energy to support the sequestration process. To the extent that a regulatory or market environment provides payment for sequestration, such payment can synergistically shorten the breakeven time for the system 200" and diversify the outputs of the system 200" (both energy and sequestration), thereby making deployment of the system 200" easier to justify.

Those skilled in the art will recognize that the illustrated placement of the sequestration module 300 benefits from a supply of fresh air from the atmospheric intake 116 and from the highest stage of pressurization of the charging subsystem 204; however, other placements may suit some applications, for example locating the sequestration module 300 closer toward the atmospheric intake 116 in the charging subsystem 204. By extension, the sequestration module 300 might connect the charging subsystem 204 to a manifold 210 in a second embodiment system 200'. Even where there is no manifold 210, the sequestration module 300 provides useful work for the charging subsystem 204 to do once the operating subsystem 202 is fully charged and thus provides an alternative to switching-off the charging subsystem 204 once charging has been completed.

There may also be applications where the sequestration module 300 is advantageously connected into the operating system 202, for example between the high pressure reservoir 114 and the load 118 or between the load 118 and the low pressure reservoir 112. For example, a cheaper but lower efficiency sequestration process might effectively treat recycled fluid in multiple passes.

Figure 12:
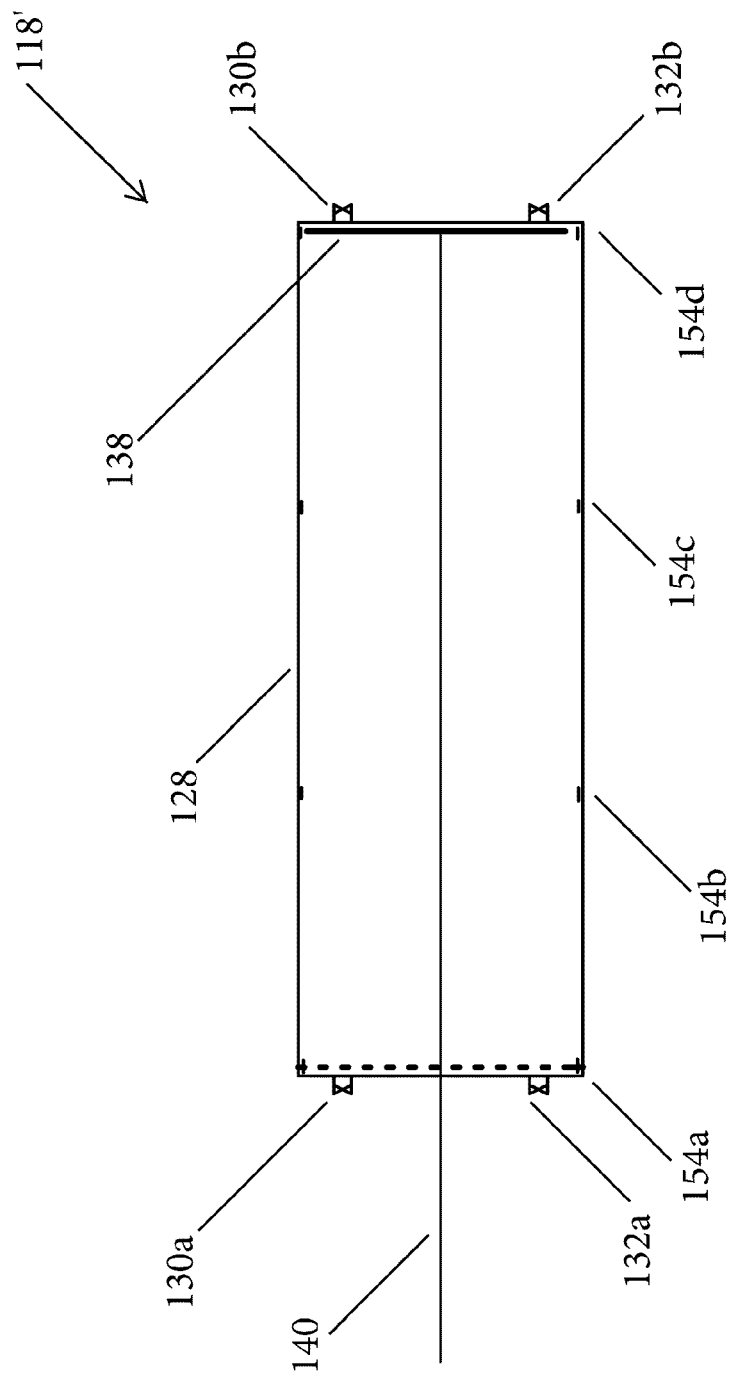
FIG. 12 is a front elevation view of a second embodiment of a load that is suitable to be powered by the system of FIG. 6a, as illustrated a compressed air ram.

Turning now to FIG. 12, a second embodiment load 118' will now be described. The load 118' has a tank 128 that contains a piston head 138 having a piston rod 140 that sealably extends outside the tank 128. The tank 128 further includes first, second, third and fourth sensors 154a, 154b, 154c, 154d distributed equally along its length to demarcate the tank 128 into thirds for a 1:1.5 expansion ratio. The tank 128 further includes opposing first and second high pressure valves 130a, 130b connectable to the high pressure reservoir 114 and opposing first and second low pressure valves 132a, 132b connectable to the low pressure reservoir 112'. In one application, three such loads 118' might be deployed in parallel at 120° separation.

Figure 13:
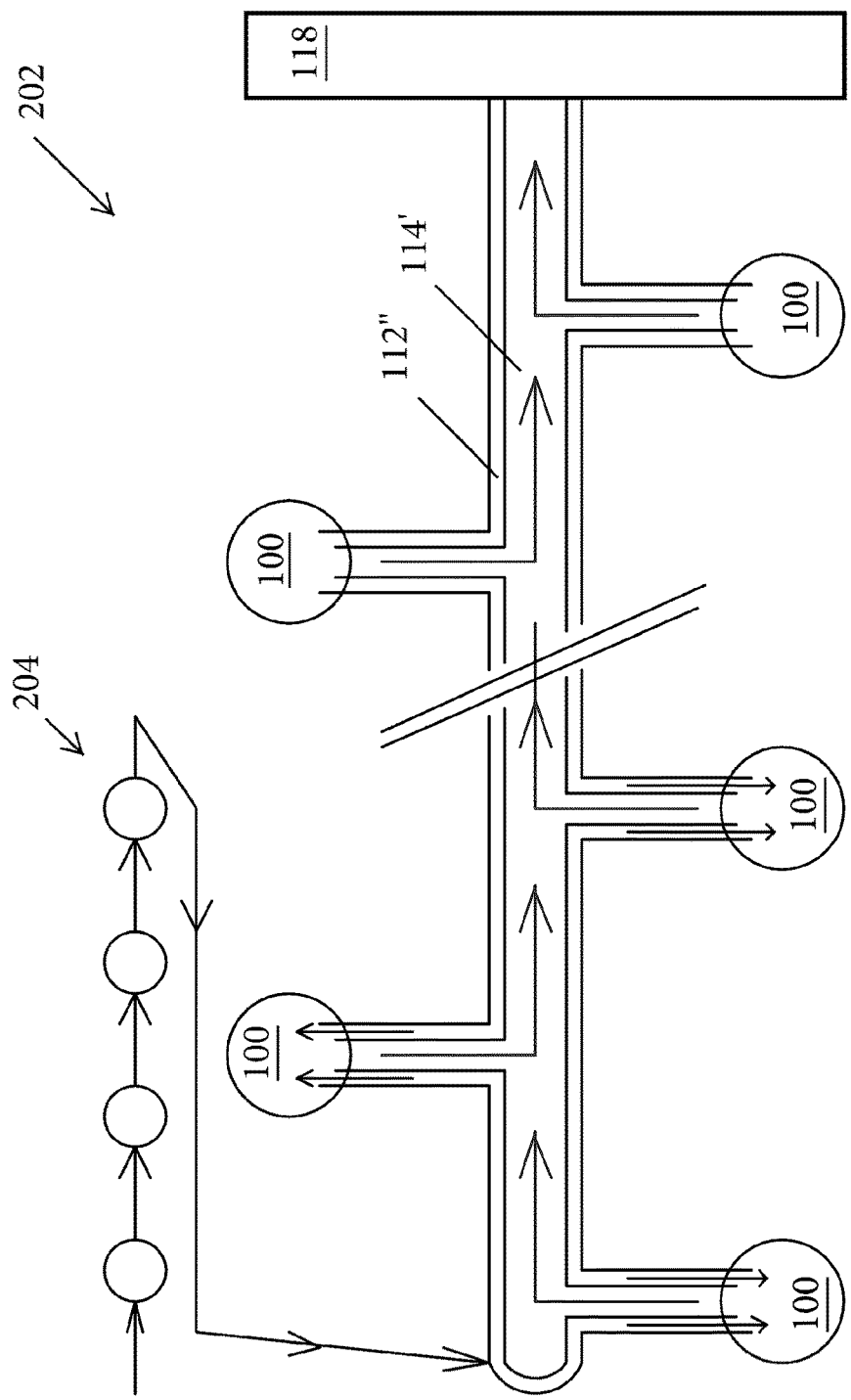
FIG. 13 is a schematic view of nested reservoir ducting deployable in the operating subsystem of the system of FIG. 6a between the parallel pressurization units and the load.

Turning now to FIG. 13, there is taught a third embodiment for the low pressure reservoir 112" and a second embodiment for the high pressure reservoir 114', which incorporate the ducting that connects them to the load 118 and the parallel pressurizing units 100 in the operating subsystem 202. In this embodiment, the high pressure reservoir 114' is nested within the low pressure reservoir 112", with both reservoirs 112", 114' connecting directly to the pressurizing units 100 and the load 118, and the low pressure reservoir 112" connecting to the charging subsystem 204. This nested arrangement reduces the amount of submerged ducting and provides more durable ducting that can accommodate higher pressures by reducing the pressure differential that any ducting wall has to withstand.

Figure 14:
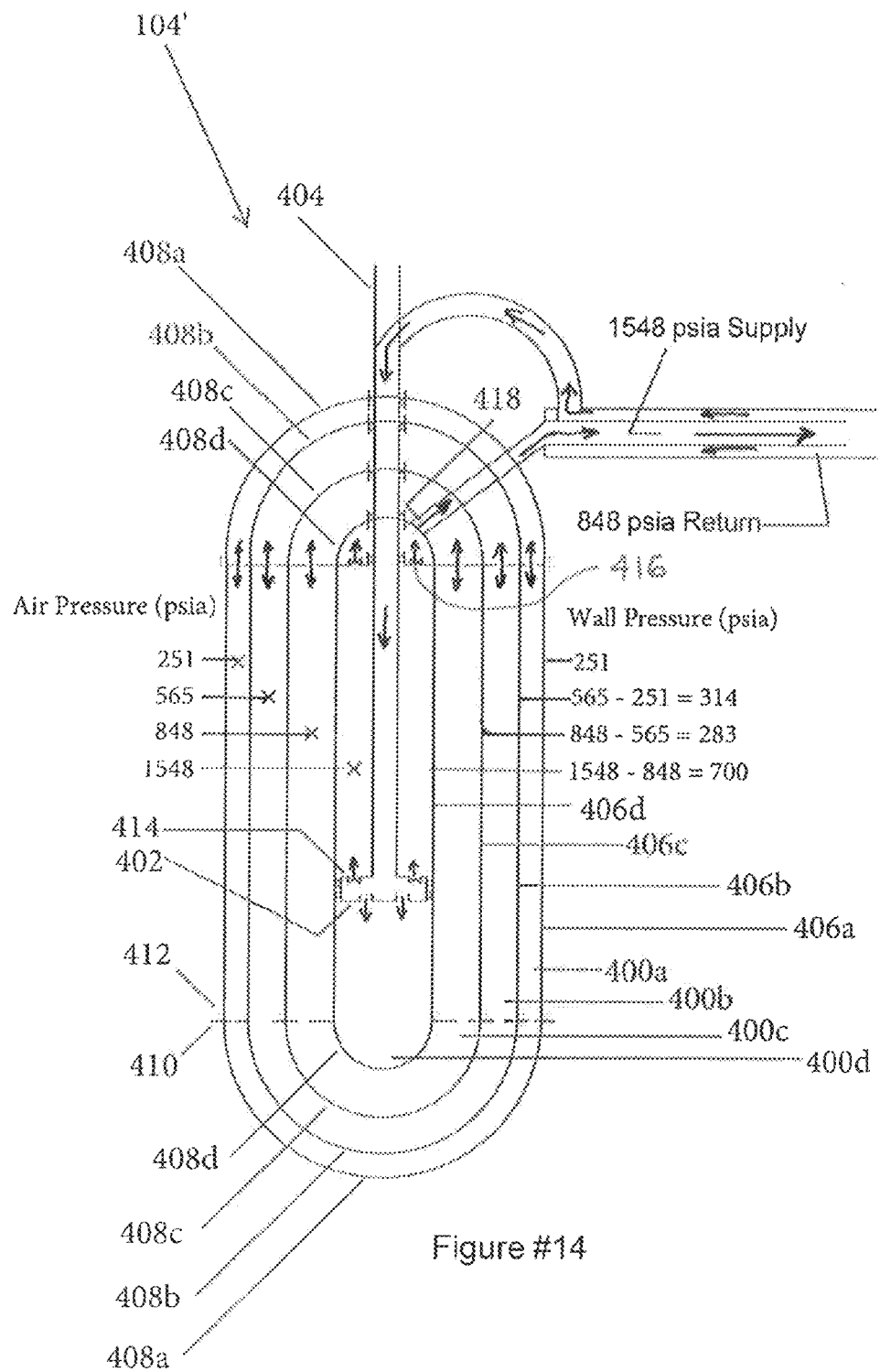
FIG. 14 is an elevation longitudinal-sectional view of a second embodiment cylinder in a pressurization unit, suitable for high-pressure operation.

Turning now to FIG. 14, there is a second embodiment cylinder 104' for use in a pressurization unit 100, which is directed to high-pressure operation. The cylinder 104' includes a series of nested sealed chambers, for example an outer sealed chamber 400a, a medial sealed chamber 400b, and an inner sealed chamber 400c, culminating in a piston chamber 400d that house a piston head 402 depending from a piston rod 404, which sealingly and slidably extends from within the piston chamber 400d through the sealed chambers 400c, 400b, 400a to the exterior of the cylinder 104' to engage a float (not shown). Those skilled in the art will recognize that more or less sealed chambers 400a, 400b, 400c might be employed.

The chambers 400 may be respectively formed within respective elongated tubes 406a, 406b, 406c, 406d that are sealed by respective opposing caps 408a, 408b, 408c, 408d, as illustrated domed. The tubes 406 and the caps 408 may have flanged ends, with flanges 410 that radiate both inward and outward to provide both a sealing surface and a fastening anchor to accept fasteners 412, for example bolts, while leaving a portion of interior diameter of the respective tubes 406 and caps 408 unobstructed so as to allow fluid to flow past the flange 410. The inwardly radiating portion of the flanges 410 of each respective circumscribing chamber 400a, 400b, 400c, are fastenable to the outwardly radiating portion of the flanges 410 of the corresponding adjacent respective circumscribed chamber 400b, 400c, 400d.

The outer, medial and inner sealed chambers 400a, 400b, 400c are charged to progressively higher pressures, for example 251 psia, 565 psia, and 848 psia respectively if working with 1.5:1 compression ratios. Analogously to a chambered nautilus, the tubes 406 and caps 408 need only be made strong enough to withstand the differential pressure between adjacently nested chambers 400, not the full pressure between the highest-pressure chamber and the ambient pressure outside the cylinder 104'. Thus the walls of the tubes 406 and caps 408 can be made thinner than otherwise possible, with the possibility of reducing the overall size of the cylinder 104'.

The piston head 402 and the piston rod 404 have hollow portions suitable to convey fluid for pressurizing into the piston chamber 400*d*; in this regard, the piston head 402 has at least one piston head valve 414 connecting the piston rod 404 to the portion of the piston chamber 400*d* above the piston head 402, as illustrated. The piston chamber 400*d* has at least one discharge valve 416 for conveying pressurized fluid out of the piston chamber 400*d* and may further have a check valve 418 to prevent pressurized fluid from flowing back into the piston chamber 400*d*, both above the piston head 402 as illustrated. Those skilled in the art will appreciate that the valves open and close under the control of interlocks (not shown), which respond for example to signals issued by position sensors (not shown) that detect the position of the piston head 402 in the piston chamber 400*d*.

Figure 15:
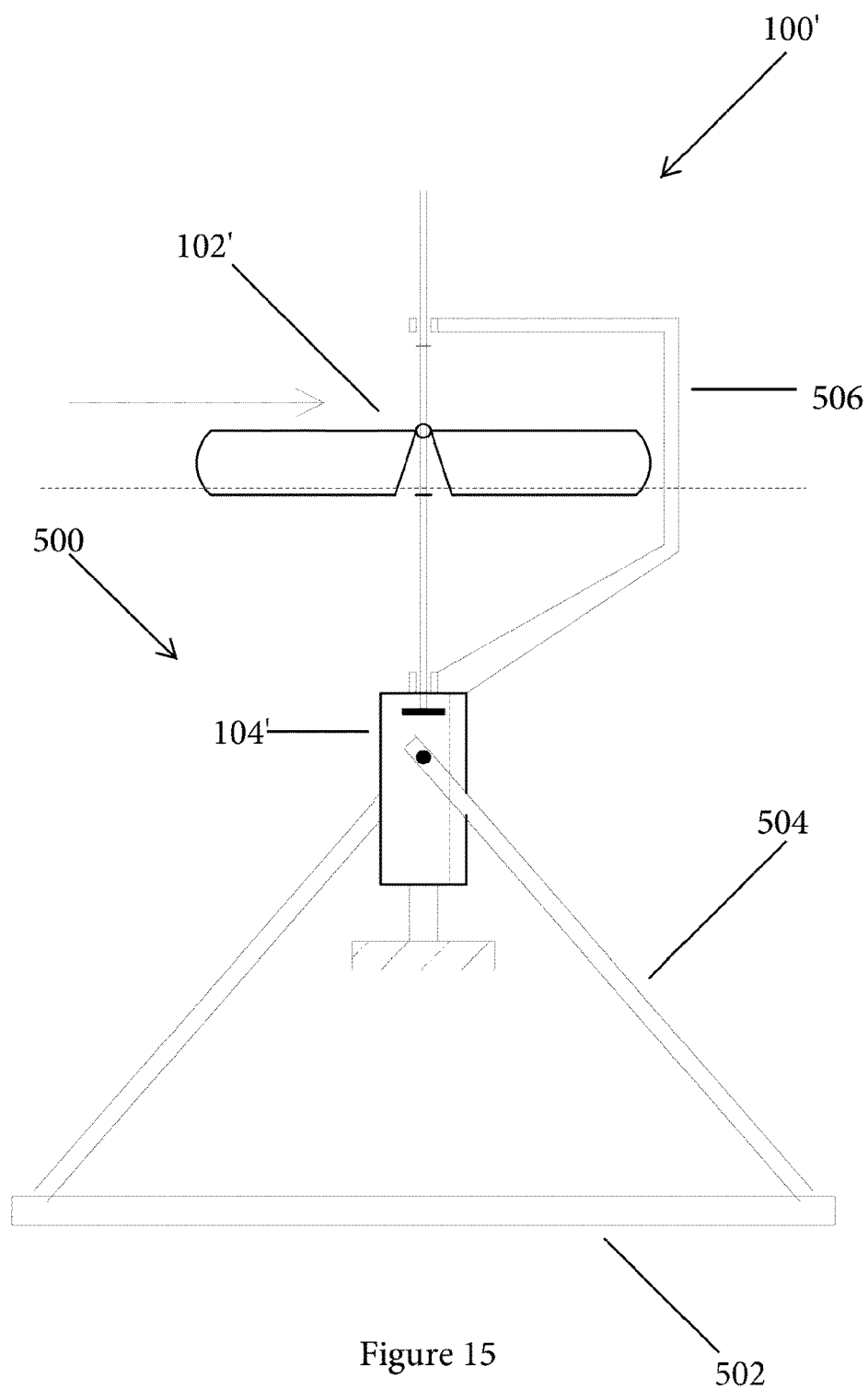
FIG. 15 is an elevation view of a second embodiment pressurizing unit.
Figure 16:
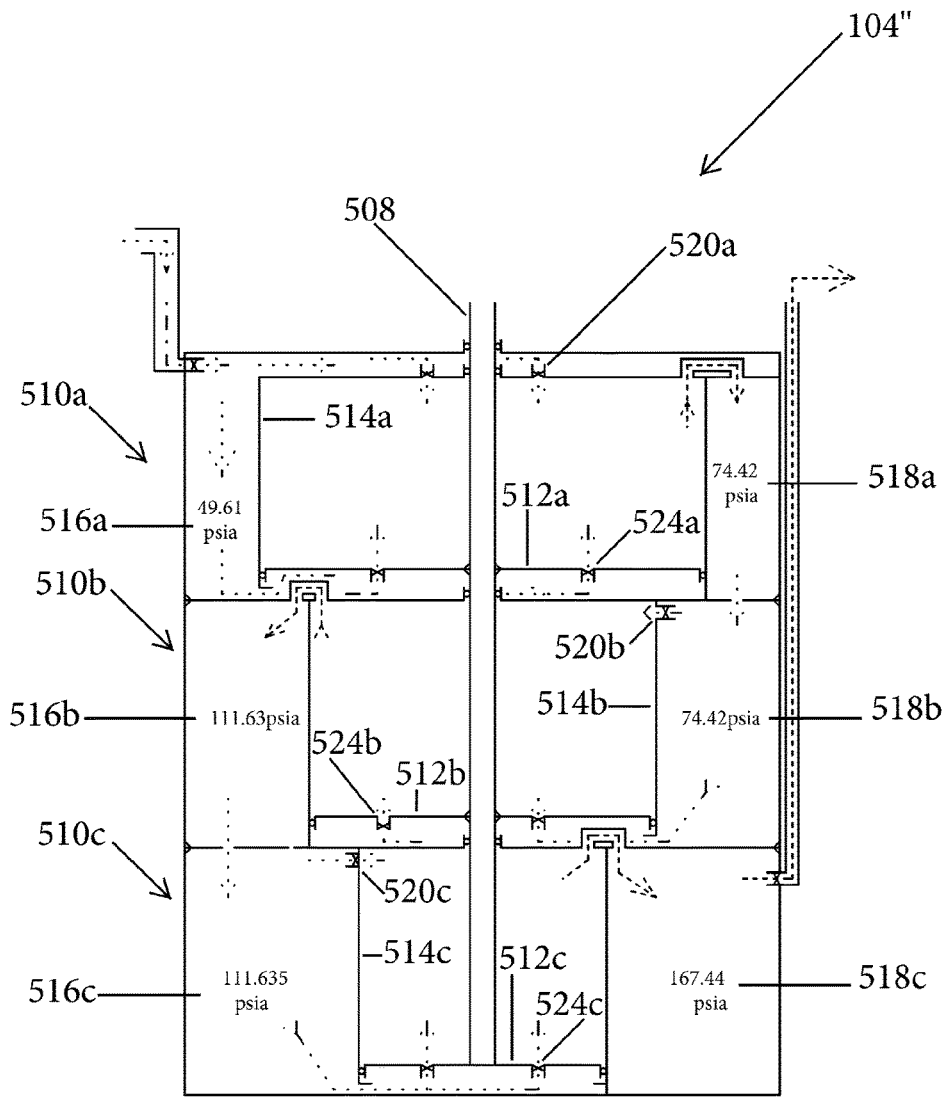
FIG. 16 is an elevation longitudinal-sectional view of a third embodiment cylinder suitable to be incorporated into the pressurizing unit of FIG. 15.

Turning now to FIGS. 15 and 16, there is taught a second embodiment pressurizing unit 100'. The unit 100' includes a frame 500 that has a reaction plate 502 that supports a gimbal 504 and a guide arm 506 and that can be anchored submerged in a body of fluid, for example sea water. A third embodiment cylinder 104" is pivotally mounted on the gimbal 504 and has a piston rod 508 that extends above the surface of the body of water and is slidably engaged by the guide arm 506. The float 102' engages the piston rod 508 between the cylinder 104" and the guide arm 506, so as to urge the piston rod 508 upward and downward along with it.

The cylinder 104" is illustrated in greater detail in FIG. 16, which shows that this one cylinder 104" is configured to provide a series of stages of pressurization, as illustrated three stages 510*a*, 510*b*, 510*c* for example, in which the stages are sufficiently separated to allow temperature independence. The heat of compression that needs to be dissipated for each stage represents about five percent of the total energy of the stage, and will be dissipated to the ocean heat sink if operated in the ocean environment. Those skilled in the art will recognize that for a float applying a particular buoyant force over one cycle, an n-stage 510 cylinder 104" would pressurize only one $n^{th}$ of the volume of fluid as would a corresponding single-stage 510 cylinder 104"; however, one n-stage 510 cylinder 104' will in general be easier to deploy and maintain than n single-stage 510 interconnected cylinders 104".

The three stages 510*a*, 510*b*, 510*c* have three respective piston heads 512*a*, 512*b*, 512*c* depending from the piston rod 508. Each stage 510 includes an elongated piston tube 514 circumscribing its respective piston head 512 and in communication with input ducting 516 and output ducting 518.

The input ducting 516 connects to the piston tube 514 in front of the piston head 512 via an input valve 520 and is directly connected to the piston tube 514 behind the piston head 512. The output ducting 518 is directly connected to the piston tube 514 in front of the piston head 512. An equalization valve 524 connects the portion of the piston tube 514 in front of the piston head 512 to the portion of the piston tube 514 behind the piston head 512. The output ducting 518 of one stage 510 is in communication with the input ducting 516 of the next stage 510.

Those skilled in the art will appreciate that the valves 520, 524 open and close under the control of interlocks (not shown), which respond for example to signals issued by position sensors (not shown) that detect the position of the piston heads 512 in the piston tubes 514. For example, each piston tube 514 might includes three position sensors (not shown) along its length: a start position sensor at the start of the tube 514, an end position sensor at the end of the tube 514, and a transition sensor in between as determined by the expansion ratio, in this case two-thirds away from the start and one-third away from the end of the tube 514 for a compression ratio of 1.5:1.

Figure 17:
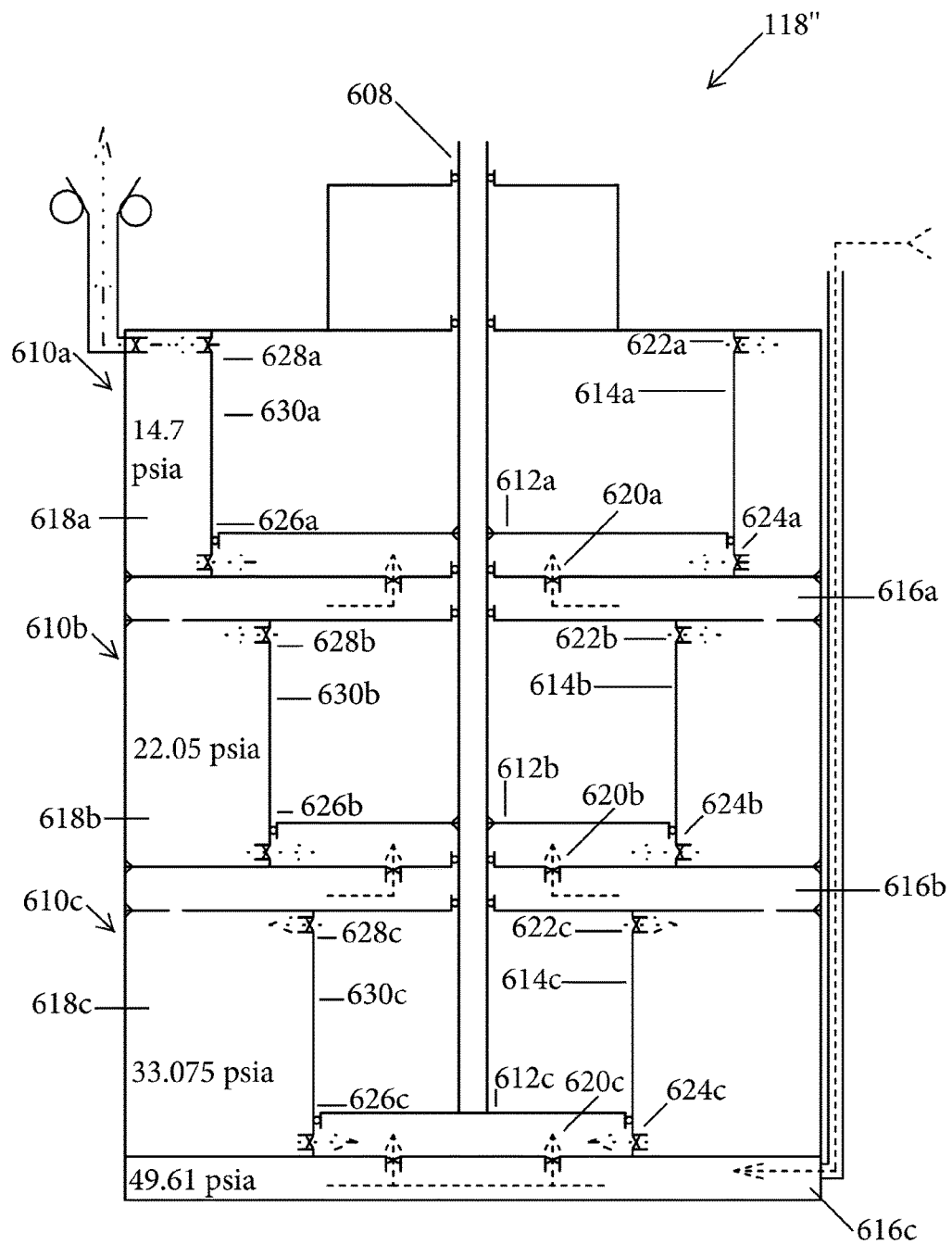
FIG. 17 is an elevation longitudinal-sectional view of a third embodiment load that is suitable to be powered by the system of FIG. 6a and which has similarities to the cylinder of FIG. 16.

Turning now to FIG. 17, there is taught a third embodiment load 118", which resembles the third embodiment cylinder 104" of FIG. 16 operated in reverse to use expanding air to drive a piston rod 608 instead of using a piston rod 508 to compress air.

The third embodiment load 118" has a tank 128' configured to provide multiple stages of expansion, as illustrated three stages 610*a*, 610*b*, 610*c* for example, in which the stages 610 are sufficiently separated to allow temperature independence. The make-up heat of expansion required for each stage represents about five percent of the total energy of the stage, and will be gained from the ocean heat sink if operated in the ocean environment.

The three stages 610*a*, 610*b*, 610*c* have three respective piston heads 612*a*, 612*b*, 612*c* depending from the piston rod 608. Each stage 610 includes an elongated piston tube 614 circumscribing its respective piston head 612 and in communication with input ducting 616 and output ducting 618.

The input ducting 616 connects to the piston tube 614 behind the piston head 612 via an input valve 620. The output ducting 618 connects to the piston tube 614 in front of the piston head 612 through an output valve 622 and behind the piston through an equalization valve 624. The output ducting of one stage 610 is in communication with the input ducting of the next stage 610. The output valve 622*a* of the lowest pressure first stage 610*a* may be connected to a pressurizing unit (100, not shown) for repressurization in a closed system 200 or vented to the atmosphere in an open system.

Each piston tube 614 also includes three position sensors along its length, a start position sensor 626 at the start of the tube 614, an end position sensor 628 at the end of the tube 614, and a transition position sensor 630 in between as determined by the expansion ratio, in this case two-thirds away from the start and one-third away from the end of the tube 614 for an expansion ratio of 1:1.5. As will be described below with respect to operation, the valves 620, 622, 624 respond to the sensors 626, 628, 630 (through interlocks), which detect the position of the piston head 612 in the piston tube 614.

(b) Operation of Specific Embodiments

With reference now to FIGS. 6-7, the operation of the first embodiment system 200 will now be described.

The system 200 is installed in an energy field, in this embodiment a body of salt water prone to transmitting water waves. The system 200 is anchored in the water, for example with much of the system 200 submerged below the water but with the respective floats 102 of each pressurization unit 100 being buoyed by the water such that water waves incident upon the respective floats 102 impart kinetic energy that is coupled to drive the respective pressurizing cylinders 104, for example as taught in the applicant's issued U.S. Pat. No. 7,690,900.

The series-connected units 100 of the charging subsystem 204 receive ambient air at atmospheric pressure at the atmospheric intake 116 and successively compress it in stages, each unit 100 receiving air at its respective input 106 for compression within its respective cylinder 104 and supplying further-compressed air at its respective output 108, perhaps through a respective output reservoir 110.

In this way, the charging subsystem 204 provides air compressed at a pressure well above atmospheric to the low pressure reservoir 112' for accumulation therein, to both initially charge the low pressure reservoir 112' and to maintain its charging, for example against leaks or open loop draws, for example to power a fog horn (not shown). Thus the charging subsystem 204 need supply air to the low pressure reservoir 112' only when the air accumulated therein is less than a predetermined threshold; otherwise, the charging subsystem 204 can for example deactivate. The threshold may be a proportion of the full capacity of the low pressure reservoir 112', for example 95%, to provide hysteresis to avoid rapid switching.

The parallel-connected units 100 of the operating subsystem 202 receive compressed air from the low pressure reservoir 112' and provide the final stage of compression, to concurrently supply the high pressure reservoir 114 with a sufficient volume of air compressed to its final pressure for accumulation therein, and to supply and power the load 118 through expansion back into the low pressure reservoir 112' for combination with the air therein. In the closed-loop embodiment illustrated, the parallel-connected units 100 in the operating subsystem 202 repressurize the air cycling between the low pressure reservoir 112' and the high pressure reservoir 114 through the load 118.

The operation of the load 118 will now be described in greater detail with reference to FIGS. 7a-7g, assuming for convenience an initial state wherein: the piston heads 138 are at the rightmost extent of their transit, the second water compartment 152b is filled with salt water, the equalization valves 144 are closed, the first low pressure valve 132a is open but the second low pressure valve 132b is closed, the first high pressure valve 130a is closed but the second high pressure valve 130b is open, the first suction valve 134a is open but the second suction valve 134b is closed, and the first expulsion valve 136a is closed but the second expulsion valve 136b is open.

For the purpose of illustration, it will also be stipulated that all pressurization units 100 have a nominal 1.5:1 compression ratio, that the twelve series-connected units 100 in the charging subsystem 204 charge the low pressure reservoir 112' to a pressure of 1800 psia, and that the twelve parallel units 100 in the operating subsystem 202 supply the high pressure reservoir 114 with air compressed to 2700 psia.

Under the urging of the air at a pressure of 2700 psia supplied by the high pressure reservoir 114 to the second air compartment 150b via the second high pressure valve 130b, the second piston head 138b travels toward the bulkhead 142, which movement urges via the piston rod 140 the first piston head 138a to travel away from the bulkhead 142.

The movement of the first piston head 138a pushes the air in the first air compartment 150a into the low pressure reservoir 112' via the first low pressure valve 132a at a pressure of 1800 psia.

The 900 psia pressure differential between the first air compartment 150a and the second air compartment 150b will cause the water in the second water compartment 152b to be expelled at 900 psia pressure through the second expulsion valve 136b into the outlet 126, for supply to the reverse osmosis filtration system (not shown).

At the same time, the movement of the first piston head 138a away from the bulkhead 142 will draw ambient seawater into the first water compartment 152a through the first suction valve 134a via the inlet 124.

When the sensor subsystem 154 detects that the second piston head 138b has reach the end of its transfer stroke and is beginning its reset stroke, it will in response generate a corresponding signal to the valves to adopt their next state, in which: the equalization valves 144 open, the first low pressure valve 132a remains open and the second low pressure valve 132b remains closed, the first high pressure valve 130a remains closed and the second high pressure valve 130b closes, the first suction valve 134a closes and the second suction valve 134b remains closed, and the first expulsion valve 136a remains closed and the second expulsion valve 136b closes.

In this reset stroke, the second piston head 138b finishes its travel toward the bulkhead 142 and the first piston head 138a finishes its travel away from the bulkhead 142, such that both piston heads 138 reach the leftmost extent of their transit. The water in the second water compartment 152b is urged through the equalization valves 144 through the bulkhead 142 and into the first water compartment 152a and the air in the expanded second air compartment 150b expands to 1800 psia and stops urging the second piston head 138b.

When the sensor subsystem 154 detects that the second piston head 138b has reached the end of its reset stroke, it will in response generate a corresponding signal to the valves to adopt their next state for the transfer stroke of the first piston head 138a, in which: the equalization valves 144 close, the first low pressure valve 132a closes and the second low pressure valve 132b opens, the first high pressure valve 130a opens and the second high pressure valve 130b remains closed, the first suction valve 134a remains closed but the second suction valve 134b opens, and the first expulsion valve 136a opens but the second expulsion valve 136b remains closed.

In a like manner now, under the urging of the air supplied by the high pressure reservoir 114 to the first air compartment 150a via the first high pressure valve 130a, the first piston head 138a will travel toward the bulkhead 142, which movement will urge via the piston rod 140 the second piston head 138b to travel away from the bulkhead 142 and the pumping cycle will repeat.

The operation of the further parallelized second embodiment system 200' will now be described with reference to FIG. 8. The charging subsystem 204 supplies air compressed above atmospheric pressure to the manifold 210 for distribution through the respective feeder valves 212 to the operating subsystems 202, 202', the large-capacity reservoir 206 and the machine 208. The respective feeder valves 212 may be set manually or may operate in response to the differential pressure across them, for the purpose of providing a sufficient supply of compressed fluid and maximizing the utilization of the charging subsystem 204.

Those skilled in the art will recognize that except for minor and occasional replenishment, necessitated for example by leaks, an operating subsystem 202 once charged runs essentially independently of a charging subsystem 204, and so the charging subsystem 204 can either be placed on standby (deactivated) or deployed through such further parallelization to power other work, to avoid underutilizing both the capital investment in the charging subsystem 204 and the energy conducted by the passing water waves. Thus the charging subsystem 204 need supply air to the low pressure reservoir 112' only when the air accumulated therein is less than a predetermined threshold; otherwise, the charging subsystem 204 can distribute surplus low pressure air for other uses, for example through the manifold 210 to the large-capacity reservoir 206 or the machine 208. The threshold may be a proportion of the full capacity of the low pressure reservoir 112', for example 95%, to provide hysteresis to avoid rapid switching.

The operation of the third embodiment system 200" will now be described with reference to FIG. 10. The charging subsystem 204 will take in atmospheric air at the atmospheric intake 116, compress the air, and then supply the compressed air to the sequestration module 300, which will process the compressed air feedstock to sequester carbon dioxide, and then supply the processed compressed air to the low pressure reservoir 112'. Beside compressed air feedstock, the charging subsystem 204 can also supply the sequestration module 300 with other process inputs, for example power and water. The sequestration module 300 might store the sequestered carbon dioxide for disposal, combine it with other substances to create a useful byproduct, or safely expelled it, perhaps in combination with neutralizing substances.

The operation of the second embodiment load 118' will now be described with reference to FIG. 12. With the piston head 138 at its furthest right position as detected by the fourth sensor 154d, the second high pressure valve 130b and the first low pressure valve 132a are open and the first high pressure valve 130a and the second low pressure valve 132b are closed. Air compressed to 2700 psia from the high pressure reservoir 114 passes into the tank 128 through the second high pressure valve 130b and urges the piston head 138 leftward, which urges the piston rod 140 outward from the tank 128. When the piston head 138 reaches the second sensor 154b it is detected as being at the transition point of its stroke, and as a result the second high pressure valve 130b and the first low pressure valve 132a close. The piston head 138 continues leftward (and the piston rod 140 continues outward) as the air behind the piston head 138 expands from 2700 psia to 1800 psia until the piston head 138 reaches its furthest left position as detected by the first sensor 154a, whereupon the first high pressure valve 130a and the second low pressure valve 132b open and the motion of the piston head 138 and the piston rod 140 reverse.

The operation of the third embodiment low pressure reservoir 112" and the second embodiment high pressure reservoir 114' will now be described with reference to FIG. 13. The charging subsystem 204 supplies low pressure air to the low pressure reservoir 112", which in turn supplies it to the pressurizing units 100' of the operating system 202 for further compression to a high pressure. The pressurizing units 100 then supply the high pressure air to the high pressure reservoir 114', which is nested within the low pressure reservoir 112", for supply to the load 118. The high pressure air expands at the load 118, in performing work, and returns into the low pressure reservoir 112" at low pressure to be repressurized in the pressurizing units 100. The low pressure reservoir 112" jacketing the high pressure reservoir 114' in effect buttresses the walls of the high pressure reservoir 114' against the ambient pressure, so that those walls do not need to withstand that pressure on their own.

The operation of the second embodiment cylinder 104" will now be described with reference to FIG. 14. In tandem with the float (not shown) as it is urged up and down by incident waves, the piston rod 404 and the piston head 402 that depends from it move up and down within the piston chamber 400d.

From an initial position at the bottom of the piston chamber 400d with the piston head valve 414 and the discharge valve 416 closed, the piston head 402 travels upward through the piston chamber 400d. When the piston head 402 has sufficiently pressurized the fluid in the piston chamber 400d, for example as when the piston head 402 is detected to be one third the length of the piston chamber 400d from the top of the piston chamber 400d for a compression ratio of 1.5:1, the discharge valve 416 opens to allow the pressurized fluid to discharge from the cylinder 104' through the check valve 418 as the piston head 402 completes its stroke to the top of the piston chamber 400d.

When the piston head 402 reaches the top of the piston chamber 400d, the discharge valve 416 closes and the piston head valve 414 opens, allowing the piston head 402 to smoothly pass through the fluid in the piston chamber 400d to the bottom of the piston chamber 400d, whereupon the piston head valve 414 closes to begin the cycle anew.

Those skilled in the art will appreciate that, as illustrated, fluid to be pressurized may be permitted to flow into the piston chamber 400d below the piston head 402 at all times and may be permitted to flow into the piston chamber 400d above the piston head 402 when the piston head valve 414 is open.

Turning now to FIGS. 15 and 16, the operation of the second embodiment pressurizing unit 100' will now be discussed. The frame 500 is anchored by the reaction plate 502, submerged in a body of fluid, for example sea water. As waves in the body of water impact the float 102', it both bobs up and down and sways back and forth. The gimbal 504 and the guide arm 506 help to keep the piston rod 105 and the cylinder 104' aligned with the float 102 during this movement, such that the piston rod 105 extends from and retracts into the cylinder 104' in tandem with the float 102' as it moves up and down in the waves.

From an initial position at the top of the piston tube 514 with the input valve 520 and the equalization valve 524 open, fluid enters the piston tube 514 through the input valve as the piston head 512 travels downward through the piston tube 514, smoothly passing through the fluid in the piston tube 514 to the bottom of the piston tube 514, whereupon the input valve 520 and equalization valve 524 close.

The float 102' then draws the piston head 512 upward through the piston tube 514, compressing the fluid in the piston tube 514 and into the output ducting 518 and either out of the pressurizing unit 100' or into the input ducting 516 of the next stage 510 in series. When the piston head 512 reaches the top of the piston tube 514, the input valve 520 and the equalization valve 524 open and the cycle starts anew.

Turning now to FIG. 17, the operation of the third embodiment load 118" will now be described. Compressed air enters the load 118" at the highest-pressure third stage 610c, for example at 49.61 psia. The third piston head 612c is pushed from the start position as detected by the third start sensor 626c to the transition position as detected by the third transition position sensor 630c, a distance equal to two-thirds of the length of the stroke under the full influence of the compressed air at 49.61 psia (the mirror image of a transfer stroke). Thereafter the compressed air will be allowed to expand (the mirror image of a compression stroke), reaching the pressure of the second input ducting 616b when the piston head 612c reaches the endpoint as detected by the third end sensor 628c in the remaining one-third of the stroke. As each of the three stages 610 is identical in physical length, all three operations will reach the start, transition and end positions simultaneously, allowing the second stage 610b and the first stage 610a to do their share of pushing on the respective piston heads 612b, 612a and common piston rod 608.

When the piston head 612 reaches the transition position sensor 630, an electric interlock will close the input valves 620 in all three stages 610. When the piston head 612 reaches the end sensor 628, the output valve 622 and the equalization valve 624 will open simultaneously by electrical interlock.

With the output valves 622 and the equalization valves 624 open in all stages, and the piston heads 612 in their fully extended work position, the vertical configuration of the tank 128', by gravitational forces, the piston heads 612 drop to the fully recharged position as detected by the start position sensors 626 in preparation for the next work stroke. With the output valves 622 and the equalization valves 624 open, the movement of the piston heads 612 will merely move compressed air at the respective stage 610 from below the piston head 612 to above the piston head 612 via the output ducting 618. Also, when the piston heads 612 have moved to the fully recharged position as detected by the start sensors 626, and each respective stage 610 is recharged, the output valves 622 and the equalization valves 624 will close and the input valves 620 will open, via electric interlock, thereby allowing the next work cycle.

The work period of the load 118" will be independent of the pressurizing period of the system 200, which is strictly dependent on the prevailing wave period. The work period is totally dependent on the time for the actual work stroke (the mirror images of the transfer and compression strokes), plus the time for the recharging stroke, both being dependent on the friction and work forces that come into play. This work period cannot be less than the corresponding mirror image of the compression process to avoid depleting the compressed air reservoir.

(c) Description Summary

Thus, it will be seen from the foregoing embodiments and examples that there has been described a way of pressurizing a fluid to power a load, by initially pressurizing the fluid in a series of stages to yield a low-pressure fluid and further pressurizing the low-pressure fluid concurrently in parallel stages to yield a high-pressure fluid for supply to the load.

While specific embodiments of the invention have been described and illustrated, such embodiments should be considered illustrative of the invention only and not as limiting the invention as construed in accordance with the accompanying claims. In particular, all quantities described have been determined empirically and those skilled in the art might well expect a wide range of values surrounding those described to provide similarly beneficial results. Thus for example, those skilled in the art might select pressurizing ratios other than 1.5:1 and might select different ratios for different stages, for example to match throughput between stages, to increase or decrease the throughput of the charging subsystem 204, or to use more or less units 100 per subsystem 202, 204.

It will be understood by those skilled in the art that various changes, modifications and substitutions can be made to the foregoing embodiments without departing from the principle and scope of the invention expressed in the claims made herein.

For example, the pressurization units 100 might be reconfigured or replaced as necessary to harness energy from sources other than water waves, for example wind flows, water currents, or solar radiation.

For example, any individual pressurizing unit 100 might itself be implemented as its own network of units 100, connected together in series, parallel, series-parallel, parallel-series, or other configuration.

For example different types of pressurizing unit 100 might be combined into one system 200, operating subsystem 202, or charging subsystem 204, For example, more than one charging subsystem 204 might feed into a low pressure reservoir 112' or manifold 210.

For example, the system 200 might be used to power a generator as a load 118.

While the invention has been described as having particular application for pumping water for reverse osmosis, those skilled in the art will recognize it has wider application, for example for generating electricity.

What is claimed is:

1. A system to pressurize a fluid to power a load, comprising:
   a load, the load being a pump for pumping liquids, and the pump having a liquid inlet and a liquid outlet;
   a high pressure gas reservoir supplying high pressure gas to the load;
   a low pressure gas reservoir receiving low pressure gas discharged from the load to supplement the low pressure gas in the low pressure gas reservoir;
   a gas charging subsystem supplying the low pressure gas to the low pressure gas reservoir, the gas charging subsystem comprising a plurality of series-connected pressurizing units operable to initially pressurize a gas to a low pressure, the gas charging subsystem deactivating when the low pressure gas reservoir is at a predetermined pressure threshold; and
   an operating pressurization system drawing the low pressure gas from the low pressure gas reservoir and supplying the high pressure gas to the high pressure gas reservoir, and the operating pressurization system comprising a plurality of parallel-connected pressurizing units;
   wherein the high pressure reservoir is nested within the low pressure reservoir, and the low pressure reservoir protects walls of the high pressure reservoir against the ambient pressure.

2. The system of claim 1, wherein the pump includes:
   a. a tank;
   b. opposing first and second piston heads slidably housed within the tank, and
   c. a bulkhead transversely bisecting the tank between the first and second piston heads;
   d. wherein the first piston head sealingly divides the tank into a first air compartment and a water compartment;
   e. wherein the second piston head sealingly divides the tank into a second air compartment and the water compartment; and
   f. wherein the bulkhead sealingly divides the water compartment into a first water compartment and a second water compartment.

3. The system of claim 1, wherein each pressurizing unit includes a cylinder with a piston rod slidably extending therefrom and a float attached to the piston rod.

4. The system of claim 1, wherein a sequestration module is connected to the gas charging subsystem, the sequestration module sequestering a component of the the low pressure gas and supplying to the low pressure reservoir the low pressure gas without the component.

5. The system of claim 4, where the gas is air and the component is carbon dioxide.

6. The system of claim 5, wherein the air enters the gas charging subsystem at atmospheric pressure through an atmospheric intake.

7. The system of claim 1, wherein the gas charging subsystem is configured to distribute surplus low pressure fluid when the low pressure reservoir is within a predetermined threshold of its capacity for storing the low pressure fluid.

8. The system of claim 7, wherein a manifold is connected to the gas charging subsystem to distribute the surplus low pressure fluid.

9. The system of claim 8, further including a second operating pressurization system connected to the manifold to receive the surplus low pressure fluid.

* * * * *